United States Patent
Ito et al.

(10) Patent No.: US 10,452,161 B2
(45) Date of Patent: Oct. 22, 2019

(54) POSITION INDICATOR INCLUDING SWITCH CIRCUIT THAT PERFORMS CHANGEOVER BETWEEN FIRST RESONANCE CIRCUIT AND SECOND RESONANCE CIRCUIT

(71) Applicant: Wacom Co., Ltd., Saitama (JP)

(72) Inventors: Masamitsu Ito, Saitama (JP); Hidetaka Takiguchi, Saitama (JP); Shigeru Yamashita, Saitama (JP)

(73) Assignee: WACOM CO., LTD., Saitama (JP)

( * ) Notice: Subject to any disclaimer, the term of this patent is extended or adjusted under 35 U.S.C. 154(b) by 69 days.

(21) Appl. No.: 15/455,777

(22) Filed: Mar. 10, 2017

(65) Prior Publication Data

US 2017/0185173 A1    Jun. 29, 2017

Related U.S. Application Data

(63) Continuation of application No. PCT/JP2015/072719, filed on Aug. 11, 2015.

(30) Foreign Application Priority Data

Oct. 6, 2014 (JP) ................................. 2014-205394

(51) Int. Cl.
*G06F 3/0354* (2013.01)
*G06F 3/041* (2006.01)
(Continued)

(52) U.S. Cl.
CPC ........ *G06F 3/03545* (2013.01); *G06F 3/0383* (2013.01); *G06F 3/03548* (2013.01);
(Continued)

(58) Field of Classification Search
CPC .. G06F 3/046; G06F 3/03545; G06F 3/03548; G06F 3/0383; G06F 3/041; G06F 3/044; G06F 3/0416

See application file for complete search history.

(56) References Cited

U.S. PATENT DOCUMENTS

| 4,878,553 A | 11/1989 | Yamanami et al. |
| 5,600,105 A | 2/1997 | Fukuzaki et al. |
| (Continued) | | |

FOREIGN PATENT DOCUMENTS

| JP | 63-70326 A | 3/1988 |
| JP | 7-200137 A | 8/1995 |
| (Continued) | | |

*Primary Examiner* — Kwang-Su Yang
(74) *Attorney, Agent, or Firm* — Seed IP Law Group LLP

(57) ABSTRACT

A position indicator includes a first resonance circuit including an inductor and a capacitor, a second resonance circuit including the first resonance circuit and a variation device configured to vary a resonance frequency or a phase of the second resonance circuit in response to an act of a user, and a switch circuit configured to perform changeover between the first resonance circuit and the second resonance circuit. The switch circuit is changed over such that, when no signal is received from outside of the position indicator and when a signal other than a predetermined signal is received from outside of the position indicator, the second resonance circuit is selected, and when the predetermined signal is received from outside of the position indicator, the first resonance circuit is selected, and the selected resonance circuit is configured to electromagnetically couple with a conductor of a sensor of the position detection apparatus.

19 Claims, 9 Drawing Sheets

(51) Int. Cl.
*G06F 3/046* (2006.01)
*G06F 3/038* (2013.01)
*G06F 3/044* (2006.01)

(52) U.S. Cl.
CPC .............. *G06F 3/041* (2013.01); *G06F 3/044* (2013.01); *G06F 3/046* (2013.01); *G06F 3/0416* (2013.01)

(56) References Cited

U.S. PATENT DOCUMENTS

| | | | |
|---|---|---|---|
| 2005/0043918 A1* | 2/2005 | Katsurahira | G06F 1/3203 702/178 |
| 2008/0149402 A1* | 6/2008 | Vos | G06F 3/03545 178/19.01 |
| 2011/0006759 A1* | 1/2011 | Fukushima | G06F 3/046 324/207.15 |

FOREIGN PATENT DOCUMENTS

| | | |
|---|---|---|
| JP | 7-219698 A | 8/1995 |
| JP | 2010-113612 A | 5/2010 |
| JP | 2010-129920 A | 6/2010 |

\* cited by examiner

POSITION INDICATOR INCLUDING SWITCH CIRCUIT THAT PERFORMS CHANGEOVER BETWEEN FIRST RESONANCE CIRCUIT AND SECOND RESONANCE CIRCUIT

BACKGROUND

Technical Field

The present disclosure relates to a position indicator which includes a resonance circuit configured from at least an inductance element and a capacitance element and used together with a position detection apparatus.

Description of the Related Art

As a position detection method of an electromagnetic induction type, a method is used conventionally in which an alternating current (AC) signal (radio wave) is transferred between a position detection apparatus (tablet) and a position indicator and coordinate values of an indication position on a sensor of the position detection apparatus by the position indicator can be detected by the position detection apparatus (for example, refer to Patent Document 1 (Japanese Patent Laid-Open No. 1988-70326)).

In the position detection apparatus of Patent Document 1, a radio wave of a predetermined frequency is transmitted from a loop coil of the sensor and received by a resonance circuit provided in the position indicator. Then, the loop coil of the sensor is changed over into a reception state such that a radio wave transmitted from the resonance circuit of the position indicator by which the radio wave has been received is received by the loop coil to generate an induction voltage. Then, the processes described above are repetitively executed successively changing over the loop coil among a plurality of loop coils of the sensor, and coordinate values of an indication position by the position indicator are calculated on the basis of the level of the induction voltage generated on each loop coil.

In a conventional position indicator used for such a position detection method of the electromagnetic induction type as described above, a variable capacitor whose capacitance continuously varies in response to a writing pressure applied to a core member of the position indicator is used as part of capacitors which configure resonance circuits each configured from a parallel connection of a coil as an example of an inductance element and a capacitor as an example of a capacitance element. On the other hand, a continuous variation of a resonance frequency (or a continuous variation of a phase angle) is detected from the induction voltage received from the resonance circuit of the position indicator by the position detection apparatus to obtain information according to the writing pressure applied to the core member described above (refer to, for example, Patent Document 2 (Japanese Patent Laid-Open No. 2010-129920)).

PRIOR ART DOCUMENTS PATENT DOCUMENTS

Patent Document 1: Japanese Patent Laid-Open No. 1988-70326

Patent Document 2: Japanese Patent Laid-Open No. 2010-129920

BRIEF SUMMARY

Technical Problems

However, in the case of the position detection method of the electromagnetic induction type described above, if some metal exists in the proximity of a place at which transmission and reception of a radio wave by an electromagnetic induction action are performed between the position indicator and the position detection apparatus, then magnetic fluxes are attracted to the metal. Therefore, the magnetic flux density passing through the coil of the resonance circuit of the position indicator varies to vary the mutual inductance M between the position indicator and the position detection apparatus and vary the resonance point of the resonance circuit of the position indicator (resulting in variation of the resonance frequency or the phase).

Therefore, if some metal exists in the proximity of a place at which transmission and reception of a radio wave by an electromagnetic induction action are performed between the position indicator and the position detection apparatus, then the resonance point (resonance frequency or phase) of the resonance circuit of the position indicator varies not only in response to a variation of the capacitance of the variable capacitor according to the variation of the writing pressure but also by an influence of the metal existing in the proximity. Therefore, according to the writing pressure detection method for the position detection apparatus of Patent Document 2, even if no writing pressure is applied to the core member of the position indicator, it may be detected that a voltage is applied, resulting in the possibility that the position detection apparatus may fail to detect the writing pressure correctly.

In addition to the case where some metal exists in the proximity of the position indicator and the position detection apparatus, where a position indicator includes a resonance circuit whose resonance point is displaced from an original unique resonance point (resonance frequency or phase) by a variation of an environment such as a temperature variation or a time-dependent variation, there is a problem also in that there is the possibility that the writing pressure detection method for the position detection apparatus of Patent Document 2 may fail to correctly detect the writing pressure applied to the core member of the position indicator.

Further, in recent years, such a position indicator and a position detection apparatus as described above have become incorporated as an inputting apparatus for a small-sized electronic apparatus such as a pad type portable terminal. In a small-sized electronic apparatus of the type described, in addition to the problem of metal or the like as described above, also such a problem has arisen that, if the position indicator is used in an inclined relationship with respect to a sensor face of the position detection apparatus, then the distance between a coil and a ferrite core of the resonance circuit of the position indicator and a shield plate of the position detection apparatus varies and the electromagnetic coupling state varies, resulting in displacement of the resonance point (resonance frequency or phase) of the resonance circuit of the position indicator.

Furthermore, there is a problem also in that, by an influence of a direct current (DC) magnetic field by a magnet provided in a speaker provided in an electronic apparatus such as a pad type portable terminal including an inputting apparatus configured from a position indicator and a position detection apparatus or a magnet for detecting opening or closing of a cover of an electronic apparatus such as a pad type portable terminal, a shield plate of the electronic apparatus is magnetically saturated to cause a phase drift in an induction voltage from the resonance circuit of the position indicator, resulting in the possibility that the writing pressure may be disabled from being detected correctly by displacement of the resonance point caused by the phase drift.

As described above, the mutual inductance between the sensor of the position detection apparatus and the resonance circuit of the position indicator varies depending upon the existence of some peripheral metal, an environmental factor such as heat, or a peripheral environment such as an inclination of the position detection apparatus of the position indicator (pen) with respect to the sensor, a material of the housing of the position indicator or the position detection apparatus or a system configuration. Therefore, there is a possibility that the resonance point (resonance frequency or phase of the resonance circuit of the position indicator) may be displaced between the position indicator and the sensor of the position detection apparatus.

Taking the foregoing problems into consideration, the applicant has created a novel writing pressure detection method by which the influence of a variation of a resonance point (resonance frequency or phase of a resonance circuit of a position indicator) between a position indicator and a sensor of a position detection apparatus according to a peripheral environment described above is eliminated in writing pressure detection in the position detection apparatus.

In the novel writing pressure detection method, a position indicator includes a first resonance circuit which does not include a variable capacitor whose capacitance varies in response to a writing pressure as a resonance element and a second resonance circuit which includes a variable capacitor whose capacitance varies in response to the writing pressure as a resonance element. The position indicator changes over a resonance circuit for electromagnetic coupling to the position detection apparatus between the first resonance circuit and the second resonance circuit.

The position detection apparatus is configured such that a signal of a first resonance frequency when the resonance circuit for electromagnetic coupling of the position indicator is the first resonance circuit is obtained from the position indicator and a signal of a second resonance frequency when the resonance circuit for electromagnetic coupling of the position indicator is the second resonance circuit is obtained from the position indicator, and a writing pressure is detected from the difference between the signal of the first reference frequency and the signal of the second resonance frequency.

With such a configuration as just described, since the signal of the first resonance frequency and the signal of the second resonance frequency similarly include a variation amount of a resonance point by an influence of such peripheral metal or the like as described above, if the difference between the signals is arithmetically operated, then the variation amounts of the resonance point by the influence of the peripheral metal or the like cancel each other. Accordingly, from the position detection apparatus, a writing pressure detection output can be obtained which correctly corresponds to the magnitude of the writing pressure while the influence of the peripheral environment such as the peripheral metal is eliminated.

In this case, it is necessary for a novel position indicator to include the first resonance circuit and the second resonance circuit as described above and to be configured, for the position detection apparatus which includes the novel writing pressure detection method, such that it changes over the resonance circuit for electromagnetic coupling between the first resonance circuit and the second resonance circuit.

Meanwhile, position detection apparatus which adopt a conventional detection method which includes such problems as described have been spread widely. Taking this into consideration, it is preferable to configure the novel position indicator such that also a position detection apparatus which adopts the conventional writing pressure detection method can detect the writing pressure by the conventional writing pressure detection method. In other words, the novel position indicator is preferably configured so as to have compatibility with both of a conventional position detection apparatus and a novel position detection apparatus which incorporates the novel writing pressure detection method.

It is to be noted that, while the foregoing description is directed to a case of a writing pressure detection method by which a writing pressure applied to the position indicator in response to an act of a user is reflected on the resonance frequency or the phase of a resonance circuit, it is a matter of course that problems similar to those described above arise also where it is tried to reflect not only the writing pressure but also various kinds of information relating to an act of a user on the resonance frequency or the phase of the resonance circuit.

Taking the forgoing into consideration, a position indicator can be provided which is used together with a novel position detection apparatus, which solves the problems described above, while compatibility is taken into consideration such that the position indicator can be used also with a conventional position detection apparatus.

Technical Solution

In order to solve the problems described above, the present disclosure provides a position indicator which includes a resonance circuit configured to establish electromagnetic coupling with a conductor of a sensor of a position detection apparatus and to reflect information relating to an act of a user. The position indicator includes: a first resonance circuit including an inductor and a capacitor; a second resonance circuit including the inductor, the capacitor, and a variation device configured to vary a resonance frequency or a phase relating of the second resonance circuit in response to the act of the user; a switch circuit configured to perform changeover between the first resonance circuit and the second resonance circuit; and a changeover circuit configured to generate a changeover signal that drives the switch circuit and supply the changeover signal to the switch circuit; wherein, when no signal is received from outside of the position indicator and when a signal other than a predetermined signal is received from outside of the position indicator, the changeover circuit does not generate the changeover signal and the second resonance circuit is configured to establish electromagnetic coupling with the conductor of the sensor of the position detection apparatus, and when the predetermined signal is received from outside of the position indicator, the changeover circuit generates the changeover signal and supplies the changeover signal to the switch circuit, the switch circuit performs changeover and the first resonance circuit is configured to establish electromagnetic coupling with the conductor of the sensor of the position detection apparatus.

In the position indicator of the present disclosure having the configuration described above, when it receives no signal from outside of the position indicator or when a signal other than a predetermined signal such as, for example, a signal from a position detection apparatus of the conventional configuration, the second resonance circuit is configured to establish electromagnetic coupling with the conductor of the sensor of the position detection apparatus, and an induction voltage according to a signal from the position detection apparatus is generated in the second resonance circuit.

The second resonance circuit generates a signal having the resonance frequency or the phase which varies in response to the act of the user, which varies an electrical element value of the variation device, for example, an inductance value or a capacitance value. Accordingly, in a position detection apparatus, for example, of the conventional configuration which is placed into a reception state of a signal from the position indicator of the present disclosure, an induction voltage according to the resonance frequency or phase of the second resonance circuit is generated. Accordingly, in the position detection apparatus of the conventional configuration, it is possible to detect information relating to an act of a user, for example, information of a writing pressure applied to the position indicator, from the induction voltage similarly as in the prior art and it is possible to ensure the compatibility.

Meanwhile, when the position indicator of the present disclosure is in a state in which it can receive a signal from the position detection apparatus but does not receive the predetermined signal, the second resonance circuit is configured to establish electromagnetic coupling with the conductor of the sensor of the position detection apparatus, and an induction voltage according to the resonance frequency or the phase which varies in response to the electrical element value of the variation element is generated in the position detection apparatus from which the signal has been transmitted. Then, if the position indicator of the present disclosure receives the predetermined signal from the position detection apparatus, it disconnects the variation element from the second resonance circuit to perform changeover from the second resonance circuit to the first resonance circuit to configure the first resonance circuit to establish electromagnetic coupling with the conductor of the sensor of the position detection apparatus. Accordingly, in the position detection apparatus in which the predetermined signal is generated, an induction voltage according to the resonance frequency or phase of the first resonance circuit which does not include the variation element is generated.

In this manner, the position detection apparatus having a function of generating the predetermined signal can acquire a first signal having the resonance frequency or the phase of the second resonance circuit which varies in response to the act of the user, which varies an electrical element value of the variation device and a second signal having a resonance frequency or a phase of the first resonance circuit, which does not include the variation device. Accordingly, the position detection apparatus having a function of generating the predetermined signal like the novel position detection apparatus disclosed herein can detect information relating to the act of the user that varies an electrical element value which varies the resonance frequency or the phase to indicate, for example, information of a writing pressure applied to the position indicator by determining a difference (frequency difference or phase difference) between the first and second signals.

Advantageous Effect

The position indicator according to the present disclosure includes the second resonance circuit including the variation device which varies the resonance frequency or the phase of the second resonance circuit in response to the act of the user and has a configuration that the variation device is disconnected from the second resonance circuit by the switch circuit which is changed over by a changeover signal generated on the basis of a predetermined signal received from outside of the position indicator to perform changeover to the first resonance circuit. Consequently, according to the present disclosure, the position indicator can be used together with the novel position detection apparatus disclosed herein and which solves, while compatibility is taken into consideration such that the position indicator can be used also with a conventional position detection apparatus, the problems described above by receiving a second signal having the resonance frequency of the second resonance circuit and a first signal having the resonance frequency of the first resonance frequency and determining a difference between the first and second signals.

MODES FOR CARRYING OUT THE DISCLOSURE

First Embodiment

Figure 1:
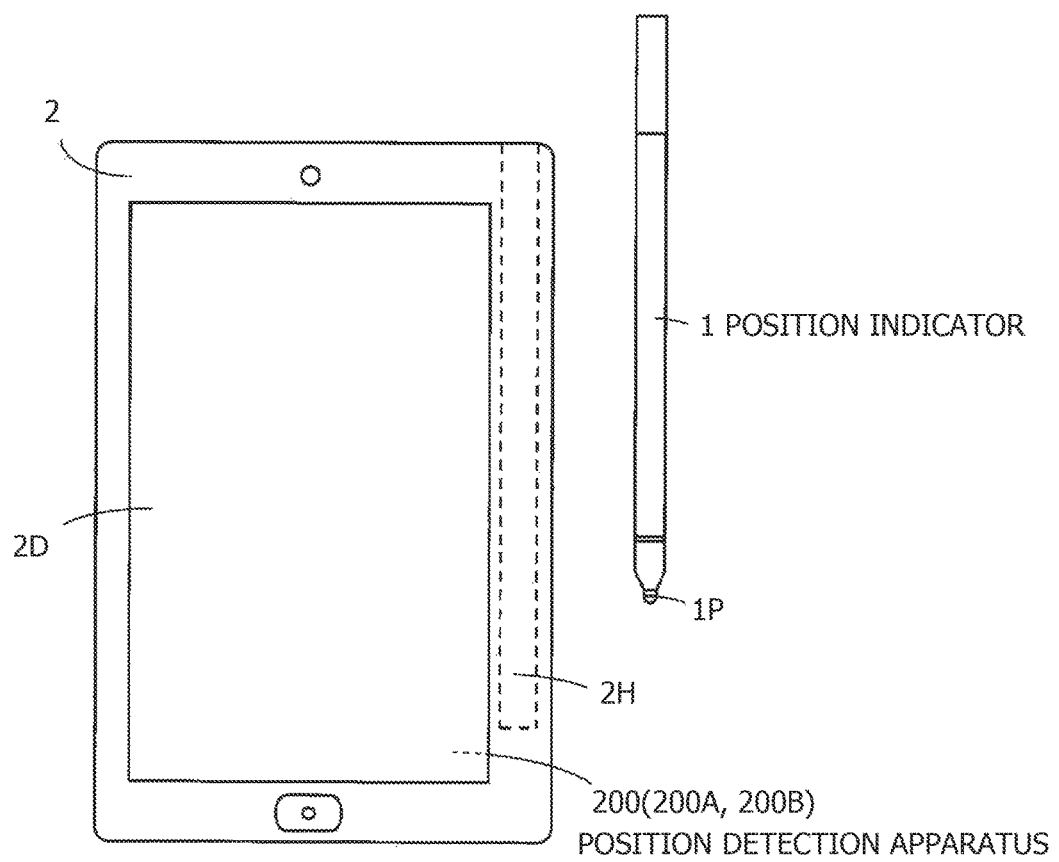
FIG. 1 is a view depicting a position indicator according to an embodiment of the present disclosure and an example of a position detection apparatus used together with the position indicator.

In the following description, a position indicator according to a first embodiment of the present disclosure is described with reference to the drawings. FIG. 1 shows an example of an appearance of a position indicator 1 according to the first embodiment of the present disclosure and an electronic apparatus 2 which includes a position detection apparatus for use with the position indicator 1. The present first embodiment is a case in which a variation device is configured from a variable capacitor that is configured to detect a writing pressure applied to a position indicator.

The electronic apparatus 2 of the present example is a portable terminal which includes a display screen 2D of a display apparatus such as, for example, a liquid crystal display (LCD) apparatus and includes a position detection apparatus 200 of the electromagnetic induction type at a lower portion (rear side) of the display screen 2D. The position indicator 1 of the first embodiment of the present disclosure has a shape of a pen and has a core member 1P provided at a tip end thereof. Further, though not depicted in FIG. 1, the position indicator 1 includes a resonance circuit for performing transmission and reception of a signal to and from the position detection apparatus 200 by electromagnetic induction.

A housing of the electronic apparatus 2 of the present example includes an accommodation recessed hole 2H for accommodating the position indicator 1 of a shape of a pen therein. A user would, as occasion demands, take out the position indicator 1 accommodated in the accommodation recessed hole 2H from the electronic apparatus 2 and perform a position indication operation using the display screen 2D as an inputting surface.

In the electronic apparatus 2, if a position indication operation is performed on the display screen 2D by the position indicator 1 of a shape of a pen, then a signal is transferred between the position detection apparatus 200 provided on the rear side of the display screen 2D and the position indicator 1 by electromagnetic coupling such that the position detection apparatus 200 detects a position at and a writing pressure with which the indication operation is performed by the position indicator 1. Then, a microcomputer provided in the electronic apparatus 2 performs a displaying process in accordance with the position and the writing pressure on the display screen 2D detected by the position detection apparatus 200.

Further, the position indicator 1 of the embodiment transmits, as information relating to an act of the user, a pressure applied to the core member 1P, namely, information regarding the writing pressure, to the position detection apparatus 200 such that the information regarding the writing pressure is reflected on the resonance frequency or the phase of the resonance circuit. In particular, if the user performs an act for pressing the display screen 2D with the position indicator 1 in order to perform position indication inputting on the display screen 2D, then the core member 1P of the position indicator 1 is acted upon by a pressure from the display screen 2D. Though not depicted, the position indicator 1 of the present embodiment has a built-in variable capacitor whose capacitance varies in response to a pressure (writing pressure) applied to the core member 1P. Since the variable capacitor is described in detail, for example, in Patent Document 2 mentioned hereinabove, description of the same is omitted herein.

Further, as hereinafter described, the position indicator 1 of the present embodiment uses the built-in variable capacitor as a variation device which varies an electrical element value (in this case, a capacitance) which varies the resonance frequency or the phase of the resonance circuit.

Further, for the position detection apparatus 200 in the present embodiment, two types are assumed including a position detection apparatus 200A of a conventional type which detects the writing pressure as a shift of the resonance frequency (phase shift) according to the variation of the variable capacitor and a position detection apparatus 200B of a novel type which detects the writing pressure as the difference (frequency difference or phase difference) between a signal of a resonance frequency or a phase according to a variation of the variable capacitor and a signal of a reference resonance frequency or phase (resonance frequency or phase of a resonance circuit which does not include a variable capacitor).

Figure 2:
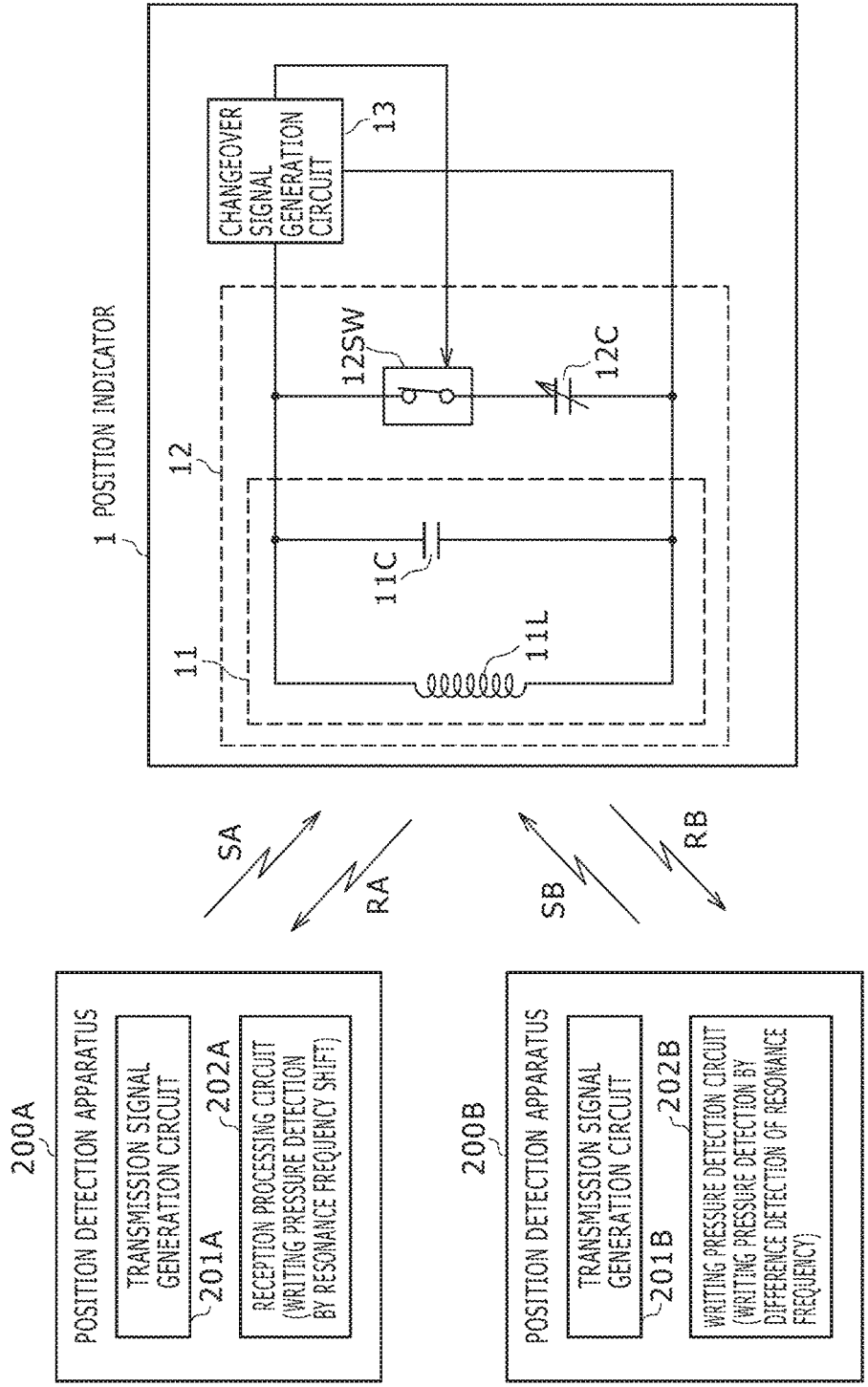
FIG. 2 is a view illustrating an example of a configuration of a position indicator according an embodiment of to the present disclosure and an example of a configuration of a position detection apparatus used together with the position indicator.
Figure 3:
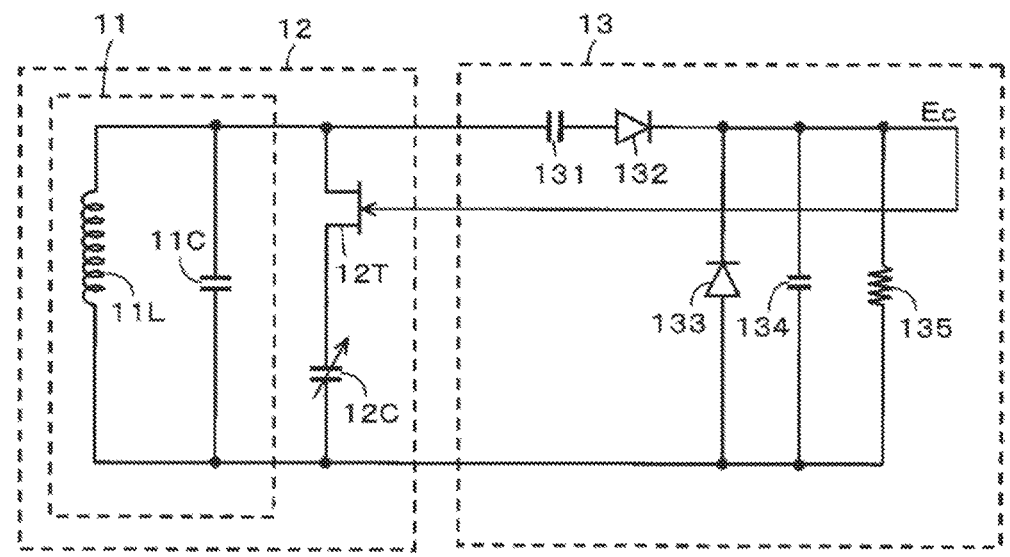
FIG. 3 is a view depicting an example of a circuit of part of a position indicator according to an embodiment of the present disclosure.
Figure 4:
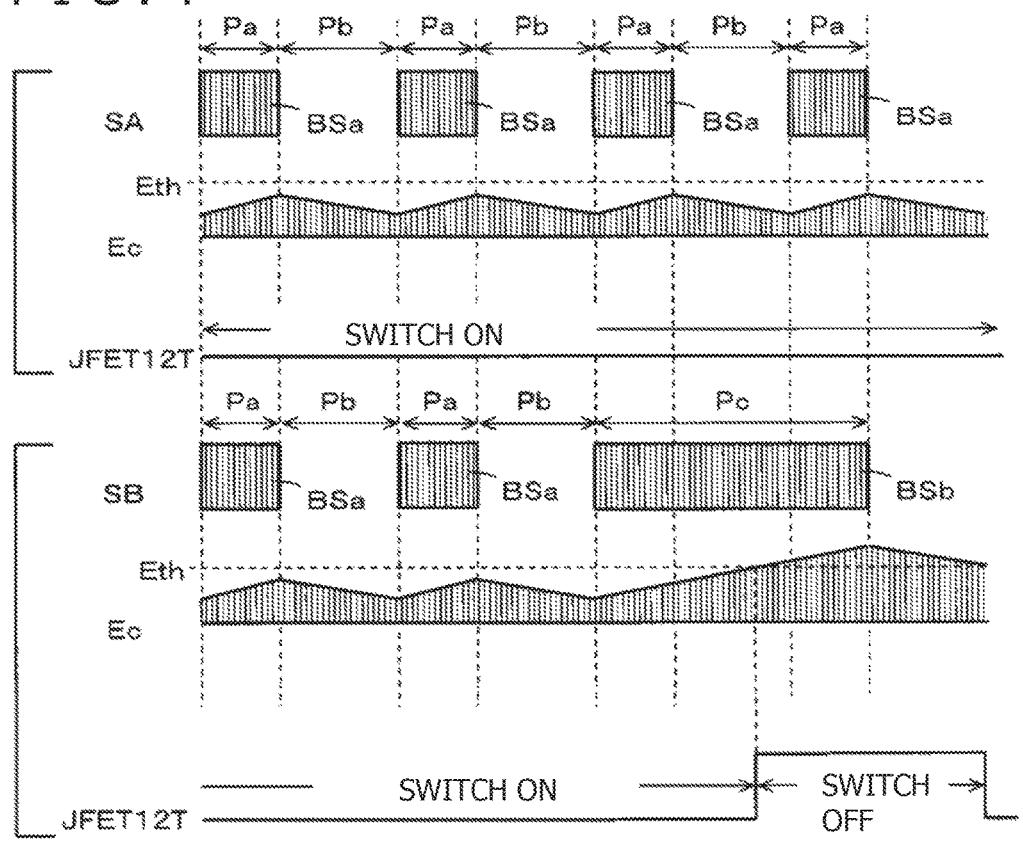
FIG. 4 is a timing chart illustrating an example of operation between the position indicator depicted in FIG. 2 and a position detection apparatus used together with the position indicator.

FIG. 2 depicts an outline of an example of a configuration of an internal circuit of the position indicator 1 of the first embodiment and illustrates a relationship between the position detection apparatus 200A of the conventional type and the position detection apparatus 200B of the novel type which configure an inputting apparatus together with the position indicator 1 of the present first embodiment. Meanwhile, FIG. 3 depicts another example of an internal circuit configuration of the position indicator 1 of the first embodiment. Further, FIG. 4 is a timing chart illustrating a relationship between AC signals transmitted from the position detection apparatus 200A of the conventional type and the position detection apparatus 200B of the novel type and a reception signal by the position indicator 1.

As depicted in FIG. 2, the internal circuit of the position indicator 1 includes a first resonance circuit 11 configured from a parallel circuit of a coil 11L as an example of an inductance element and a capacitor 11C as an example of a capacitance element, a second resonance circuit 12 including the first resonance circuit 11 and configured from a series circuit of a switch circuit 12SW and a variable capacitor 12C connected in parallel with the capacitor 11C, and a changeover signal generation circuit 13 for generating a changeover signal for the switch circuit 12SW.

Though not depicted, the coil 11L is configured, for example, from a ferrite core around which a conductor in the form of a thin wire having an insulating coating thereon is wound, and is fixedly disposed in the proximity of a tip end portion of the core member 1P in the case (housing) of the position indicator 1. The capacitor 11C is disposed on a printed circuit board disposed in the case (housing) of the position indicator 1 and electrically connected to the coil 11L on the printed circuit board.

The variable capacitor 12C is configured from a writing pressure detection module configured such that the capacitance thereof varies in response to the writing pressure applied to the core member 1P as described above and disclosed, for example, in Patent Document 2.

The switch circuit 12SW is, in the present embodiment, configured from a semiconductor switch circuit which is normally in an on state and hence a conducting state (of the so-called normally on type), and is disposed on the printed circuit board disposed in the case (housing) of the position indicator 1. And, on the printed circuit board, the variable capacitor 12C and the switch circuit 12SW are electrically connected in series, and the serial circuit of the variable capacitor 12C and the switch circuit 12SW is connected in parallel with the first resonance circuit 11.

The changeover signal generation circuit 13 is configured on the printed circuit board and generates a changeover signal for the switch circuit 12SW from a resonance signal obtained from the first resonance circuit 11 or the second resonance circuit 12. Then, the changeover signal generation circuit 13 controls the switch circuit 12SW so as to be switched off using the generated changeover signal. In the present embodiment, the changeover signal generation circuit 13 configures a changeover circuit for driving the switch circuit 12SW for changeover.

As hereinafter described, in the position indicator 1 of the present embodiment, in a state in which it is used together with the position detection apparatus 200A of the conventional type, the changeover signal generation circuit 13 does not generate, on the basis of a signal from the position detection apparatus 200A of the conventional type, a changeover signal for changing over the switch circuit 12SW from on to off, and the switch circuit 12SW remains in an on state. Then, if the position indicator 1 of the present embodiment is placed into a state in which it is used together with the position detection apparatus 200B of the novel type, then the changeover signal generation circuit 13 generates a changeover signal for changing over the switch circuit 12SW from on to off on the basis of a signal from the position detection apparatus 200B of the novel type.

Accordingly, in the position indicator 1 of the present embodiment, when it is in a state in which the position indicator 1 does not receive any signal and the switch circuit 12SW is on and is in a conducting state and in another state in which the position indicator 1 is used together with the position detection apparatus 200A of the conventional type, the second resonance circuit 12 in which the coil 11L, capacitor 11C and variable capacitor 12C are connected in parallel with one another serves as a resonance circuit for electromagnetic coupling to the position detection apparatus 200A or the position detection apparatus 200B. This second resonance circuit 12 has a circuit configuration substantially same as that of a resonance circuit of a conventional position indicator of the electromagnetic induction type.

Further, in the position indicator 1, if the switch circuit 12SW is changed over to an off state and placed into a non-conducting state by a changeover signal from the changeover signal generation circuit 13, then the resonance circuit for electromagnetic coupling of the position indicator 1 is changed over from the second resonance circuit 12 to the first resonance circuit 11 which is configured from a parallel circuit of the coil 11L and the capacitor 11C. In particular, when the switch circuit 12SW is changed over to an off state, the variable capacitor 12C which is a variation device is disconnected from the second resonance circuit 12 and the resonance circuit is changed over to the first resonance circuit 11. The switch circuit 12SW configures a circuit for cutting off the variable capacitor 12C which is a variation device from the second resonance circuit 12.

The position detection apparatus 200B of the novel type detects the writing pressure on the basis of the difference between a signal of the resonance frequency of the second resonance circuit 12 and a signal of the resonance frequency of the first resonance circuit 11. Therefore, the position detection apparatus 200B of the novel type acquires a signal of the resonance frequency of the first resonance circuit 11 as a signal for arithmetically operating the difference from a signal of the resonance frequency of the second resonance circuit 12 at a predetermined timing as hereinafter described. Then, the position detection apparatus 200B of the novel type uses the acquired signal of the resonance frequency of the first resonance circuit 11 for arithmetic operation of the difference from the signal of the resonance frequency of the second resonance circuit 12 which is acquired within some other period.

FIG. 3 depicts an example of a more detailed configuration of the internal circuit of the position indicator 1 of the present embodiment. In the example depicted in FIG. 3, a junction field effect transistor (JFET) 12T of the normally on type is used as the switch circuit 12SW. Further, the source-drain of the JFET 12T is connected in series with the variable capacitor 12C, and the series circuit of the JFET 12T and the variable capacitor 12C is connected in parallel with the coil 11L and the capacitor 11C.

The changeover signal generation circuit 13 in the present example is configured as a half wave doubling rectifier as depicted in FIG. 3. In particular, the changeover signal generation circuit 13 is configured from a coupling capacitor 131 to the first resonance circuit 11 or the second resonance circuit 12, diodes 132 and 133 for rectification, a holding capacitor 134 for a rectification voltage, and a smoothing resistor 135 for the rectification voltage.

In the changeover signal generation circuit 13 of the configuration described, an AC signal received from the position detection apparatus 200A or 200B by the first resonance circuit 11 or the second resonance circuit 12 is rectified by the diodes 132 and 133 and accumulated into and held by the holding capacitor 134. Then, the held voltage Ec of the holding capacitor 134 is supplied as a changeover signal to the gate of the JFET 12T.

The JFET 12T keeps an on state (conducting state) as a normal state when the held voltage Ec of the holding capacitor 134 is lower than a predetermined threshold value voltage Eth, but is changed over to an off state (non-conducting state) if the held voltage Ec becomes equal to or higher than the predetermined threshold value voltage Eth. Then, as described hereinabove, in the normal state in which the JFET 12T is on, the second resonance circuit 12 as the resonance circuit for electromagnetic coupling of the position indicator 1 is placed into an operative state, but if the JFET 12T is changed over to an off state, then the first resonance circuit 11 as the resonance circuit for electromagnetic coupling of the position indicator 1 is changed over to a state in which the first resonance circuit 11 is placed into an operative state.

Meanwhile, as depicted in FIG. 2, the position detection apparatus 200A of the conventional type includes a transmission signal generation circuit 201A which transmits a transmission signal SA to the position indicator 1, and a reception processing circuit 202A which receives a signal from the position detector 1 and then performs detection of an indicated position by the position indicator and detection of the writing pressure.

Meanwhile, the position detection apparatus 200B of the novel type includes a transmission signal generation circuit 201B which transmits a transmission signal SB different from the transmission signal SA to the position indicator 1, and a reception processing circuit 202B which performs detection of an indication position by the position indicator 1 in a similar manner as in the position detection apparatus 200A and performs detection of the writing pressure by a method different from that of the position detection apparatus 200A.

Here, the transmission signal SA and the transmission signal SB from the position detection apparatus 200A and the position detection apparatus 200B use AC signals of the same frequency fo, which is selected in accordance with the resonance frequency of the first resonance circuit 11 and the second resonance circuit 12. Further, the transmission signal SA and the transmission signal SB are different in a manner of transmission such as a transmission time length or a transmission interval.

In particular, the transmission signal SA from the transmission signal generation circuit 201A of the position detection apparatus 200A of the conventional type in the present example is formed as such a signal that a burst signal BSa of the frequency fo transmitted continuously with a time length Pa is repeated intermittently after every time interval Pb as illustrated in the upper portion of FIG. 4. In this case, the time length Pa of continuous transmission and the time interval Pb of the burst signal BSa are set as such a time length and a time interval that, when the transmission signal SA is received by the first resonance circuit 11 or the second resonance circuit 12 of the position indicator 1, the held voltage Ec of the holding capacitor 134 in the changeover signal generation circuit 13 does not exceed the threshold value voltage Eth as illustrated in the upper portion of FIG. 4.

Accordingly, in the state in which the position indicator 1 is used together with the position detection apparatus 200A of the conventional type, depending upon the transmission signal SA from the transmission signal generation circuit 201A, the held voltage Ec of the holding capacitor 134 of the changeover signal generation circuit 13 of the position indicator 1 does not exceed the threshold value voltage Eth (refer to the upper portion of FIG. 4). Therefore, the JFET 12T of the position indicator 1 does not enter an off state but normally remains on as illustrated in the upper portion of FIG. 4. Therefore, in the position indicator 1, the second resonance circuit 12 operates as a resonance circuit for electromagnetic coupling to the position detection apparatus 200A.

Therefore, the position detection apparatus 200A receives a signal RA having a frequency according to the writing pressure of the variable capacitor 12C of the second resonance circuit 12 and detects an indication position by the position indicator 1 from the signal RA. Further, the position detection apparatus 200A detects a frequency shift (or phase shift) from the frequency fo of the signal RA to detect the writing pressure applied to the core member 1P of the position indicator 1.

An example of a circuit configuration of the transmission signal generation circuit 201A and the reception processing circuit 202A of the position detection apparatus 200A of the conventional type is described below with reference to FIG. 5.

Figure 5:
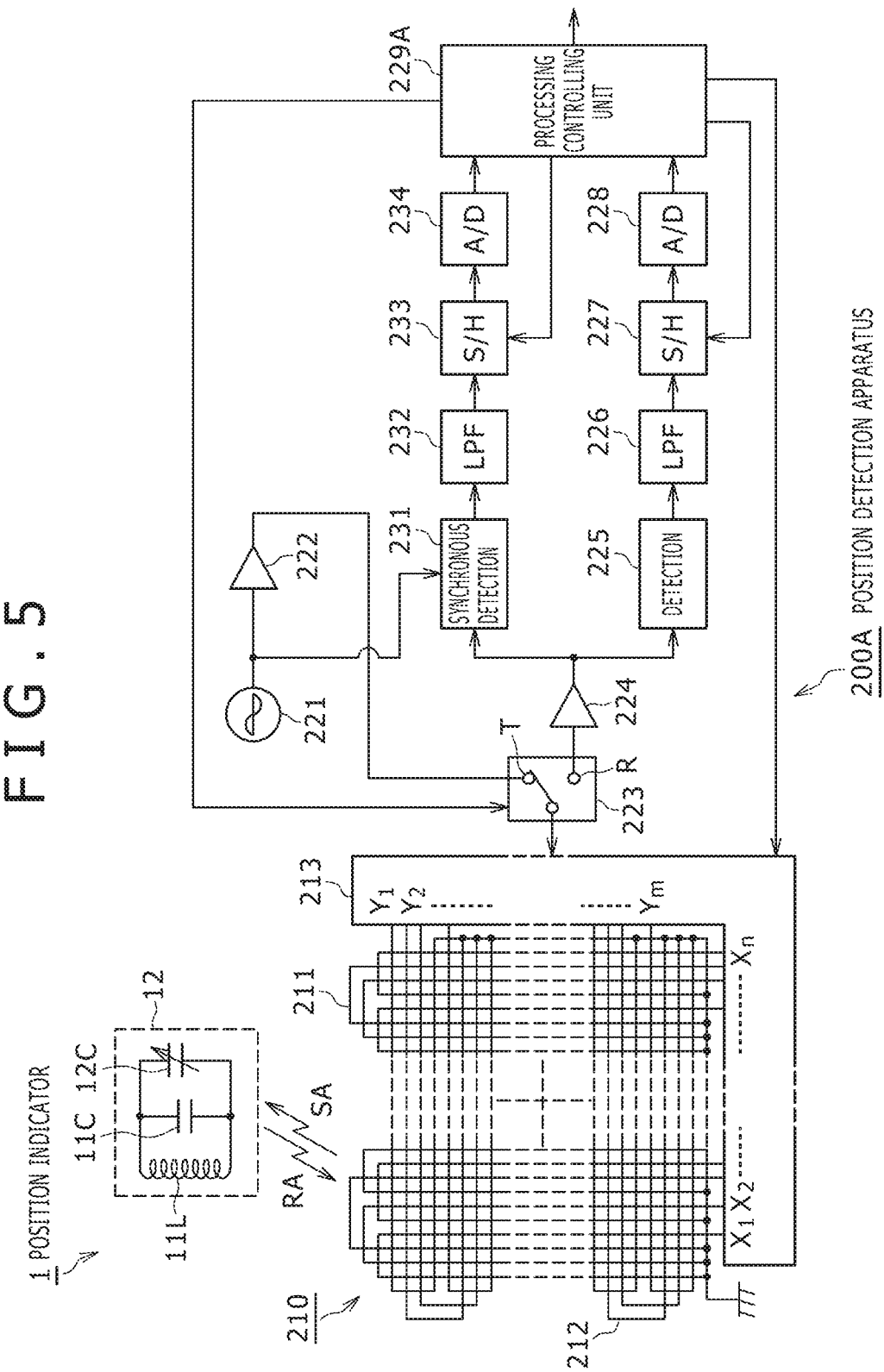
FIG. 5 is a block diagram depicting an example of a configuration of a position detection apparatus of a conventional type and a position indictor according to an embodiment of the present disclosure.

FIG. 5 is a block diagram depicting an example of a circuit configuration of the position indicator 1 and the position detection apparatus 200A. When the position indicator 1 is used together with the position detection apparatus 200A, it is in a state in which only the second resonance circuit 12 normally operates as a resonance circuit for electromagnetic coupling as described hereinabove.

The position detection apparatus 200A has a sensor 210 formed therein from an X-axis direction loop coil group 211 and a Y-axis direction loop coil group 212 stacked with each other. The loop coil groups 211 and 212 are formed, for example, from n and m rectangular loop coils, respectively. The loop coils configuring the loop coil groups 211 and 212 are disposed such that they are juxtaposed at equal distances and successively overlap with each other.

Further, in the position detection apparatus 200A, a selection circuit 213 to which the X-axis direction loop coil group 211 and the Y-axis direction loop coil group 212 are connected is provided. This selection circuit 213 successively selects the loop coils of one of the two loop coil groups 211 and 212.

Furthermore, the position detection apparatus 200A includes an oscillator 221, a current driver 222, a changeover connection circuit 223, a reception amplifier 224, a detector 225, a low-pass filter 226, a sample and hold circuit 227, an analog to digital (A/D) conversion circuit 228, a process controlling unit 229A, a synchronous detector 231, another low-pass filter 232, another sample and hold circuit 233, and another A/D conversion circuit 234. The process controlling unit 229A is configured from a microcomputer.

The transmission signal generation circuit 201A is configured from the oscillator 221, current driver 222, changeover connection circuit 223, process controlling unit 229A and sensor 210. Further, a detection circuit of an indication position by the position indicator 1 is configured from the sensor 210, changeover connection circuit 223, reception amplifier 224, detector 225, low-pass filter 226, sample and hold circuit 227, A/D conversion circuit 228, and process controlling unit 229A, and a detection circuit of the writing pressure applied to the position indicator 1 is configured the sensor 210, changeover connection circuit 223, reception amplifier 224, synchronous detector 231, low-pass filter 232, sample and hold circuit 233, A/D conversion circuit 234 and process controlling unit 229A.

The oscillator 221 generates an AC signal of the frequency fo. Further, the oscillator 221 supplies the generated AC signal to the current driver 222 and the synchronous detector 231. The current driver 222 converts the AC signal supplied thereto from the oscillator 221 into electric current and sends out the electric current to the changeover connection circuit 223. The changeover connection circuit 223 changes over the connection destination (transmission side terminal T or reception side terminal R) to which a loop coil selected by the selection circuit 213 is to be connected under the control of the process controlling unit 229A. To the transmission side terminal T from between the connection destinations, the current driver 222 is connected, and to the reception side terminal R, the reception amplifier 224 is connected.

Further, the process controlling unit 229A changes over the changeover connection circuit 223 such that the changeover connection circuit 223 is connected to the transmission side terminal T within a period of the time length Pa illustrated in the upper portion of FIG. 4 but is connected to the reception side terminal R within another period of the time interval Pb. Accordingly, within a period of the time length Pa, the AC signal of the frequency fo is transmitted as a transmission signal SA to the position indicator 1 through the loop coil selected by the selection circuit 213.

Then, if the changeover connection circuit 223 is changed over and connected to the reception side terminal R within a period of the time interval Pb, then an induction voltage is generated in the loop coil selected by the selection circuit 213 in response to the signal RA sent thereto from the resonance circuit of the position indicator 1. In this case, the induction voltage of the loop coil indicated by the position indicator and positioned nearer to the position indicator 1 is higher than the induction voltage of the loop coil at any other position.

The induction voltage generated in the loop coil selected by the selection circuit 213 is sent to the reception amplifier 224 through the selection circuit 213 and the changeover connection circuit 223. The reception amplifier 224 amplifies the induction voltage supplied thereto from the loop coil and sends out the amplified induction voltage to the detector 225 and the synchronous detector 231.

The detector 225 detects the induction voltage generated in the loop coil, namely, the reception signal, and sends out the detected reception signal to the low-pass filter 226. The low-pass filter 226 has a cutoff frequency sufficiently lower than the frequency fo described hereinabove, and converts an output signal of the detector 225 into a DC signal and sends out the DC signal to the sample and hold circuit 227. The sample and hold circuit 227 holds a voltage value at a predetermined timing of the output signal of the low-pass filter 226, particularly, at a predetermined timing within a reception period and sends out the held voltage value to the A/D conversion circuit 228. The A/D conversion circuit 228 converts an analog output of the sample and hold circuit 227 into a digital signal and outputs the digital signal to the process controlling unit 229A.

On the other hand, the synchronous detector 231 performs synchronous detection of an output signal of the reception amplifier 224 with the AC signal from the oscillator 221 and sends out a signal of a level according to a phase difference between the signals to the low-pass filter 232. This low-pass filter 232 has a cutoff frequency sufficiently lower than the frequency fo, and converts an output signal of the synchronous detector 231 into a DC signal and sends out the DC signal to the sample and hold circuit 233. This sample and hold circuit 233 holds a voltage value at a predetermined timing of the output signal of the low-pass filter 232 and sends out the held voltage value to the A/D conversion circuit 234. The A/D conversion circuit 234 converts an analog output of the sample and hold circuit 233 into a digital signal and outputs the digital signal to the process controlling unit 229A.

The process controlling unit 229A controls the components of the position detection apparatus 200A. In particular, the process controlling unit 229A controls selection of a loop coil by the selection circuit 213, changeover of the changeover connection circuit 223 and timings of the sample and hold circuits 227 and 233. The process controlling unit 229A controls the X-axis direction loop coil group 211 and the Y-axis direction loop coil group 212 to transmit radio waves, in the present example, for a continuous transmission time period of the time length Pa from the X-axis direction loop coil group 211 and the Y-axis direction loop coil group 212 on the basis of input signals from the A/D conversion circuits 228 and 234.

As described hereinabove, in each of the loop coils of the X-axis direction loop coil group 211 and the Y-axis direction loop coil group 212, an induction voltage is generated from a radio wave transmitted from the position indicator 1. The process controlling unit 229A detects, on the basis of a digital signal from the A/D conversion circuit 228, the level of the voltage value of the induction voltage generated in each loop coil and calculates coordinate values of the indication position in the X-axis direction and the Y-axis direction of the position indicator 1.

Further, the process controlling unit 229A detects, on the basis of a digital signal from the A/D conversion circuit 234, the level of a signal according to a frequency shift (phase shift) between the transmitted radio wave and the received radio wave and detects the writing pressure applied to the position indicator 1 on the basis of the detected level of the signal.

In this manner, with the position detection apparatus 200A of the conventional type, the process controlling unit 229A can detect a position indicated by the position indicator 1 of the present disclosure which comes near to the process controlling unit 229A, and by detecting a received frequency shift (or phase shift) by a writing pressure detection method similar to that of a conventional one, information of the writing pressure value of the position indicator 1 can be obtained.

Now, the position detection apparatus 200B of the novel type is described. A transmission signal SB from the transmission signal generation circuit 201B of the position detection apparatus 200B of the novel type is, similarly as in the transmission signal generation circuit 201A of the position detection apparatus 200A, a signal in which not only a burst signal BSa of the time length Pa of the frequency fo is repeated intermittently after the time interval Pb but a burst signal BSb of the frequency fo transmitted continuously within a time length Pc (Pc>Pa) in accordance with a timing at which a signal of the resonance frequency of the first resonance circuit is acquired in order to detect the writing pressure from the difference from a signal of the resonance frequency of the second resonance circuit 12 is included as illustrated in the lower portion of FIG. 4. Here, the time length Pc of the burst signal BSb is such a time length that, when the transmission signal SB is received by the first resonance circuit 11 or the second resonance circuit 12 of the position indicator 1, the held voltage Ec of the holding capacitor 134 in the changeover signal generation circuit 13 exceeds the threshold value voltage Eth over a predetermined time period as illustrated in the lower portion of FIG. 4.

From the foregoing, in the state in which the position indicator 1 is used together with the position detection apparatus 200B of the novel type, the rectification output voltage Ec of the changeover signal generation circuit 13 of the position indicator 1 exceeds the threshold value voltage Eth by a burst signal of the time length Pc of the transmission signal SB from the transmission signal generation circuit 201B (refer to the lower portion of FIG. 4). Therefore, the JFET 12T of the position indicator 1 is changed over from on to off at a timing at which the burst signal BSb of the time length Pc is transmitted as the transmission signal SB as illustrated in the lower portion of FIG. 4, and the position indicator 1 operates such that the resonance circuit for electromagnetic coupling to the position detection apparatus 200B is changed over from the second resonance circuit 12 to the first resonance circuit 11.

The position detection apparatus 200B detects a position indicated by the position indicator 1 in a similar manner to the position detection apparatus 200A described hereinabove within a period within which the burst signal BSa of the time length Pa from within the transmission signal SB is repeated intermittently at the time interval Pb. Further, the position detection apparatus 200B detects, in the present example, the frequency and the phase of the reception signal at the time and keeps a signal level according to the detected frequency and phase.

Then, in order to detect the writing pressure applied to the position indicator 1 from the difference from the signal of the resonance frequency of the second resonance circuit 12, when a timing at which the signal of the resonance frequency of the first resonance circuit is to be acquired comes, the position detection apparatus 200B transmits the burst signal BSb of the time length Pc as the transmission signal SB. Consequently, the resonance circuit for electromagnetic coupling of the position indicator 1 changes over from the second resonance circuit 12 to the first resonance circuit 11, and therefore, the position detection apparatus 200B detects, in the present example, the frequency and the phase of the reception signal at the time to obtain a signal level according to the detected frequency and phase.

The frequency and the phase detected when the resonance frequency for electromagnetic coupling of the position indicator 1 is the second resonance circuit 12 are a frequency and a phase which include components by the variable capacitor 12C which exhibits a capacitance according to the writing pressure applied to the position indicator 1. On the other hand, the frequency and the phase detected when the resonance circuit for electromagnetic coupling of the position indicator 1 is the first resonance circuit 11 are a reference frequency and a phase of a reference which do not include components by the variable capacitor 12C which exhibits a capacitance according to the writing pressure. Accordingly, it is possible to detect the writing pressure applied to the position indicator 1 as the differences between both frequencies and both phases.

Then, since signals from the first resonance circuit 11 and the second resonance circuit 12 of the position indicator 1 similarly include an influence of a surrounding environment on the mutual inductance in the electromagnetic coupling between the position indicator 1 and the position detection apparatus 200B, if the difference is determined, then the influence of the surrounding environment on the mutual inductance is cancelled and removed. Accordingly, it is possible to detect an accurate writing pressure eliminating the influence of the surrounding environment.

Figure 6:
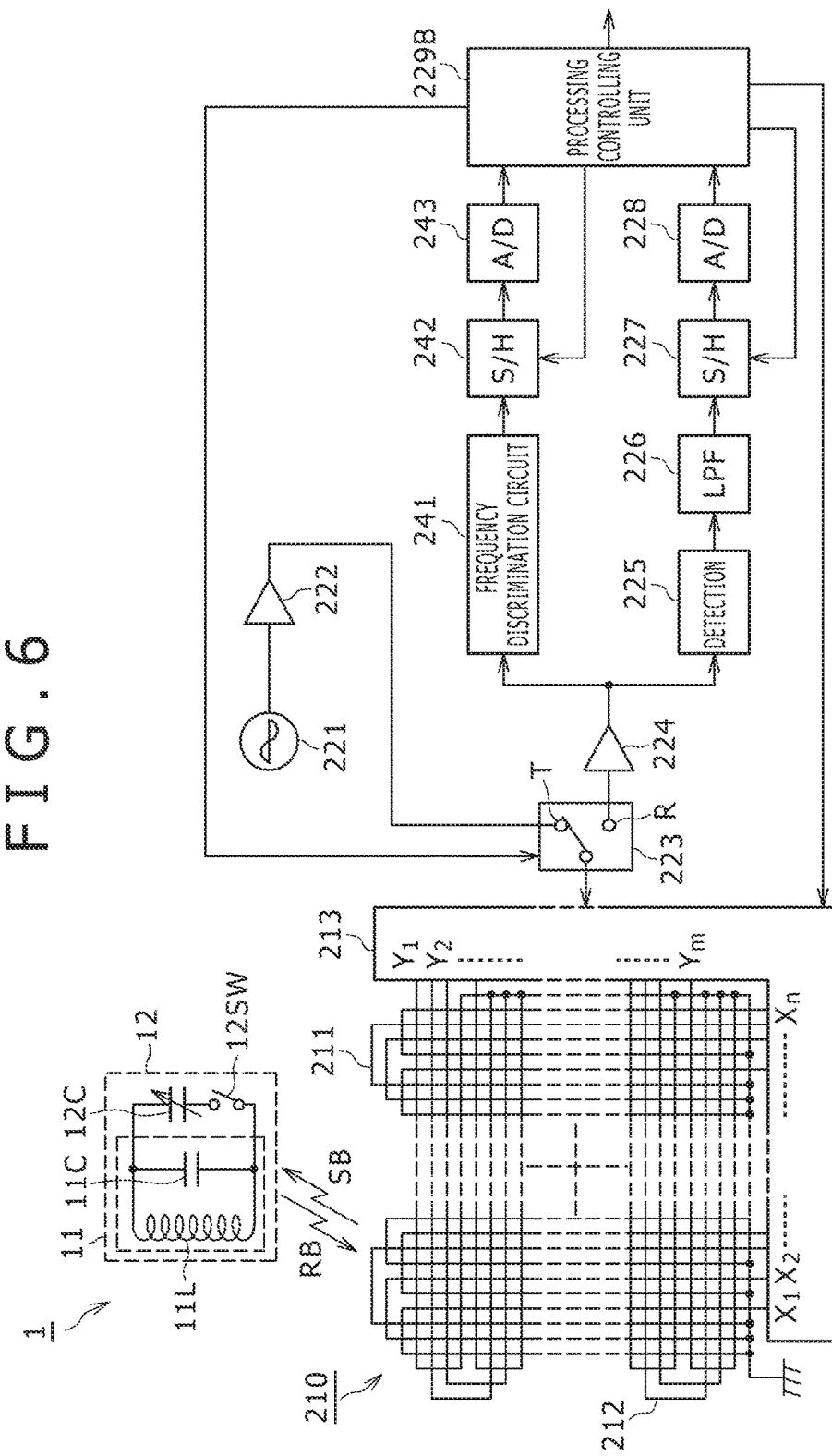
FIG. 6 is a block diagram depicting an example of a configuration of a position detection apparatus a position indicator according to an embodiment of the present disclosure.

An example of a circuit configuration of the transmission signal generation circuit 201B and the reception processing circuit 202B of the position detection apparatus 200B of the novel type is depicted in FIG. 6. In FIG. 6, like elements to those of the position detection apparatus 200A depicted in FIG. 5 are denoted by like reference symbols and overlapping description of them is omitted herein.

As depicted in FIG. 6, if the example of the circuit configuration of the transmission signal generation circuit 201B and the reception processing circuit 202B of the position detection apparatus 200B of the novel type are compared with those of the position detection apparatus 200A, then it is different in that the process controlling unit 229A is replaced by a process controlling unit 229B and the configuration portion of the detection circuit of the writing pressure applied to the position indicator 1 is configured including a frequency discrimination circuit 241, a sample and hold circuit 242 and an A/D conversion circuit 243 in place of the synchronous detector 231, low-pass filter 232, sample and hold circuit 233 and A/D conversion circuit 234. In regard to the other part, the position detection apparatus 200B of the novel type and the position detection apparatus 200A of the conventional type have a same configuration.

In the position indicator 1 in this instance, the switch circuit 12SW configured from the JFET 12T is changed over to an off state by a changeover signal generated on the basis of the transmission signal SB from the position detection apparatus 200B to disconnect (cut off) the variable capacitor 12C thereby to perform changeover from the second resonance circuit 12 to the first resonance circuit 11. When the position indicator 1 does not receive the transmission signal SB from the position detection apparatus 200B, the switch circuit 12SW is in an on state and the resonance circuit for electromagnetic coupling of the position indicator 1 is the second resonance circuit 12.

Thus, the process controlling unit 229B of the position detection apparatus 200B changes over the changeover connection circuit 223 such that changeover connection circuit 223 is connected to the transmission side terminal T within a period of the continuous transmission time length Pa illustrated in the lower portion of FIG. 4 but is connected to the reception side terminal R within a period of the time interval Pb in a similar manner as in the process controlling unit 229A of the position detection apparatus 200A. Consequently, in this case, the switch circuit 12SW is not changed over to an off state as described hereinabove, and since the resonance circuit for electromagnetic coupling of the position indicator 1 remains the second resonance circuit 12, the position detection apparatus 200B detects position coordinates on the sensor 210 indicated by the position indicator 1 in a similar manner as in the position detection apparatus 200A described hereinabove.

Further, in the position detection apparatus 200B, the frequency discrimination circuit 241 discriminates the frequency of a signal from a reception amplifier obtained when the resonance circuit for electromagnetic coupling of the position indicator 1 is the second resonance circuit 12 to obtain a signal level corresponding to the frequency and the phase. Then, the signal level according to the frequency and the phase is sampled and held by the sample and hold circuit 242 and converted by the A/D conversion circuit 234 into and supplied as a digital signal to the process controlling unit 229B. The process controlling unit 229B holds a signal level corresponding to the frequency and the phase of the reception signal when the resonance circuit for electromagnetic coupling of the position indicator 1 is the second resonance circuit 12.

Then, in order to detect the writing pressure applied to the position indicator 1 from the difference from a signal of the resonance frequency of the second resonance circuit 12, the process controlling unit 229B of the position detection apparatus 200B connects, when a timing at which a signal of the resonance frequency of the first resonance circuit is to be acquired comes, the changeover connection circuit 223 to the transmission side terminal T within the continuous transmission time period Pc illustrated in the lower portion of FIG. 4. Consequently, the held voltage Ec of the holding capacitor 134 of the changeover signal generation circuit 13 of the position indicator 1 exceeds the threshold value voltage Eth, and therefore, the switch circuit 12SW is changed over to an off state and the resonance circuit for electromagnetic coupling of the position indicator 1 is changed over from the second resonance circuit 12 to the first resonance circuit 11.

Then, in the position detection apparatus 200B, the frequency discrimination circuit 241 discriminates the frequency of the phase of a signal from the reception amplifier obtained when the resonance circuit for electromagnetic coupling of the position indicator 1 is changed over to the first resonance circuit 11 to obtain a signal level according to the frequency and the phase. Then, the signal level according to the frequency and the phase is sampled and held by the sample and hold circuit 242 and converted by the A/D conversion circuit 243 into and supplied as a digital signal to the process controlling unit 229B. The process controlling unit 229B detects the writing pressure applied to the position indicator 1 from the difference between the signal level corresponding to the frequency and the phase of the reception signal when the resonance circuit for electromagnetic coupling of the position indicator 1 is the first resonance circuit 11 and the held signal level corresponding to the frequency and the phase of the reception signal when the resonance circuit for electromagnetic coupling of the position indicator 1 is the second resonance circuit 12.

In this manner, with the position detection apparatus 200B of the novel type, the position indicated by the approaching position indicator 1 of the present embodiment can be detected by the process controlling unit 229B. Further, information of the writing pressure value of the position indicator 1 can be obtained accurately by the process controlling unit 229B without being influenced by the peripheral environment at all using the novel writing pressure detection method of detecting the writing pressure on the basis of the difference between the reception frequency when the resonance circuit for electromagnetic coupling of the position indicator 1 is the second resonance circuit and the reception frequency when the resonance circuit for electromagnetic coupling of the position indicator 1 is the first resonance circuit.

Modifications to the First Embodiment

<Changeover Signal of JFET 12T in Changeover Signal Generation Circuit 13>

In the first embodiment described above, the position detection apparatus 200B of the novel type uses, as a changeover signal for changing over the switch circuit 12SW (JFET 12T) of the position indicator 1, the burst signal BSb of the time length Pc having a long continuous transmission time period. However, the changeover signal for changing over the switch circuit 12SW (JFET 12T) of the position indicator 1 is not limited to this. For example, the time interval in intermittent transmission of the burst signal BSa of the time length Pa may be set to a time interval Pd shorter than the time interval Pb as illustrated in FIG. 7 such that the held voltage Ec of the holding capacitor 134 exceeds the threshold value voltage Eth thereby to place the JFET 12T configuring the switch circuit 12SW into an off state.

Figure 7:
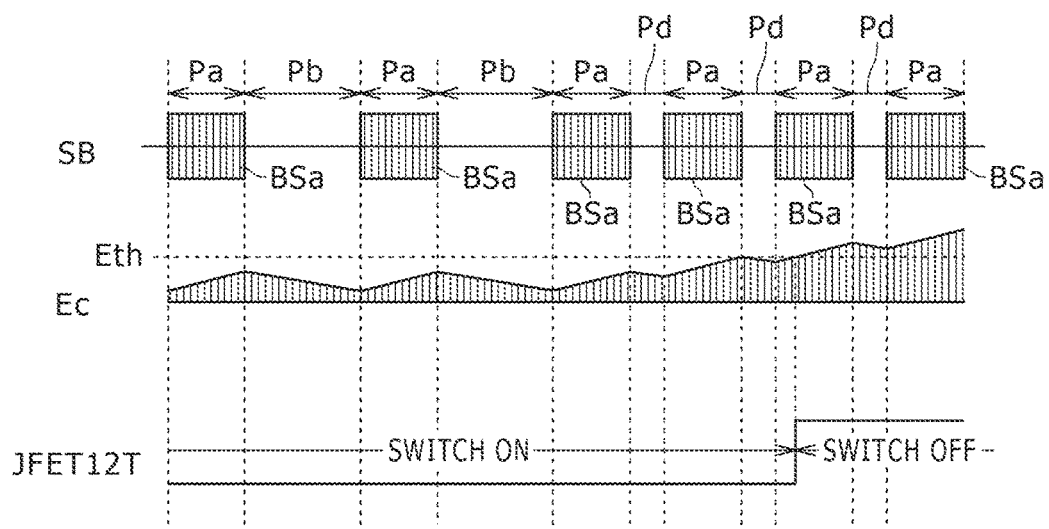
FIG. 7 is a timing chart illustrating an example of operation between a position indicator and a position detection apparatus used with the position indicator according to an embodiment of the present disclosure.

In particular, although the held voltage Ec of the holding capacitor 134 of the changeover signal generation circuit 13 of the position indicator 1 does not exceed the threshold value Eth within a period within which the burst signal BSa of the time length Pa is transmitted intermittently at the time interval Pb, the held voltage Ec exceeds the threshold value Eth within a period within which the burst signal BSa of the time length Pa is transmitted intermittently at the time interval Pd shorter than the time interval Pb as depicted in FIG. 7. Therefore, within the period within which the burst signal BSa of the time length Pa is transmitted intermittently at the time interval Pd shorter than the time interval Pb, the JFET 12T in the position indicator 1 is changed over from an on state to an off state, and the resonance circuit for electromagnetic coupling of the position indicator 1 is changed over from the second resonance circuit 12 to the first resonance circuit 11.

Further, while continuous transmission of the signal of the frequency fo for the time length Pc longer than the time length Pa is illustrated only once in FIG. 4, naturally the position detection apparatus 200B may perform continuous transmission of the time length Pc repetitively by a plural number of times intermittently at predetermined time intervals such that the writing pressure applied to the position indicator 1 can be detected with certainty. The time interval in this case may be equal to the time interval Pb or may be shorter or longer than the time interval Pb.

Further, in the foregoing description of the embodiment, it is described that, in the position detection apparatus 200B of the novel type, the difference between the signals when the resonance circuit for electromagnetic coupling of the position indicator 1 is the second resonance circuit and when the resonance circuit for electromagnetic coupling of the position detector 1 is the first resonance circuit is given as a frequency and a phase. However, the difference may be given only as a frequency or only as a phase.

<Configuration of Switch Circuit 12SW>

In the second resonance circuit 12 of the position indicator 1, when the resistance when the switch circuit 12SW conducts is high, then signal level attenuation of the signal received from the position detection apparatus occurs. Therefore, preferably the resistance of the switch circuit 12SW when it conducts is as low as possible.

In the embodiment described above, as the switch circuit 12SW, the JFET 12T of the normally on type which is on in a normal state is used. However, since the JFET 12T has such a high resistance as several hundreds ohms when it conducts, there is the possibility that attenuation of the signal level may occur in the resonance circuit of the position indicator 1.

Figure 8:
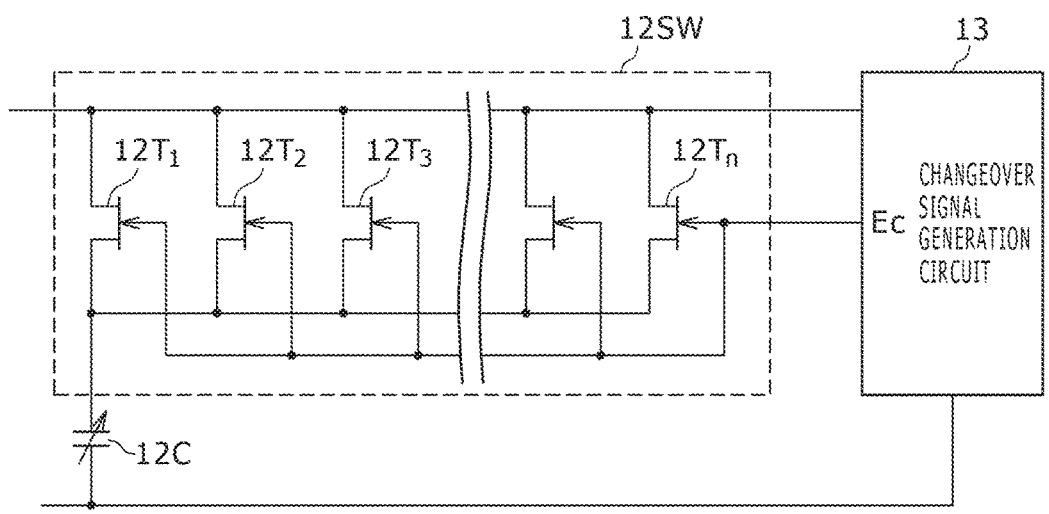
FIG. 8 is a view depicting part of a position indicator according to an embodiment of the present disclosure.

An example of the switch circuit 12SW which solves this problem is depicted in FIG. 8. FIG. 8 depicts a series circuit of the switch circuit 12SW and the variable capacitor 12C of the second resonance circuit 12. In this example, as the switch circuit 12SW, a parallel connection in a ladder shape of a plurality of JFETs $12T_1$, $12T_2$, $12T_3$, ..., $12T_n$ (n is an integer equal to or greater than 2). In particular, the sources of the JFETs $12T_1$, $12T_2$, $12T_3$, ..., $12T_n$ are connected commonly and the drains of them are connected commonly and further connected to the variable capacitor 12C. Further, a changeover signal from the changeover signal generation circuit 13 is supplied to the gate of each of the JFETs $12T_1$, $12T_2$, $12T_3$, ..., $12T_n$.

Where the switch circuit 12SW is configured in such a manner as described above, if the resistance of one JFET when it conducts is represented by R, then the resistance of the switch circuit 12SW when it conducts is given by R/n and therefore can be made low. Therefore, the attenuation of the signal level received from the position detection apparatus when the second resonance circuit 12 is applied as the resonance circuit for electromagnetic coupling of the position indicator 1 can be reduced.

Further, though not depicted, the attenuation of the signal level received from the position detection apparatus when the second resonance circuit 12 is applied as the resonance circuit for electromagnetic coupling of the position indicator 1 may be reduced not by using the JFET 12T but by using a depletion type field effect transistor whose resistance when it conducts is low as the switch circuit 12SW. It is to be noted that the depletion type field effect transistor is an element specialized for digital logics, where the depletion type field effect transistor is used as the switch circuit 12SW in the present embodiment, the $V_{DS}$–$I_D$ characteristic ($V_{DS}$ is a drain-source voltage, and $I_D$ is drain current) is optimized for an analog switch.

With the position indicator 1 of the embodiment described above, it is possible to use it together with the position detection apparatus 200A of the conventional type and use it together with the position detection apparatus 200B of the novel type, and compatibility can be ensured. Besides, in this case, since the position indicator 1 is automatically changed over between a case in which it is used together with the position detection apparatus 200A and another case in which it is used together with the position detection apparatus 200B, the user of the position indicator 1 need not perform any changeover operation. Also there is an advantageous effect that the user need not recognize whether the position detection apparatus is the position detection apparatus 200A of the conventional type or the position detection apparatus 200B of the novel type.

Further, the position indicator 1 of the first embodiment described above is configured such that the switch circuit 12SW is configured from a semiconductor switch circuit which is normally on and in a conducting state (so-called normally on type), and the switch circuit 12SW is changed over to an off state to disconnect (cut off) the variable capacitor 12C which is an example of a variation device from the second resonance circuit 12 to perform changeover to the first resonance circuit 11. Therefore, the position indicator 1 exhibits the following advantageous effects.

In the position indicator 1, in order to keep the compatibility of the position detection apparatus 200A of the conventional type and the position detection apparatus 200B of the novel type, ideally the reference resonance circuit (first resonance circuit 11) is instantaneously changed over to and changed over back from the second resonance circuit 12 which is operating normally. To this end, it is necessary that the changeover speed is high. This is because, if the changeover speed is low, then the interruption of the state in which the second resonance circuit 12 resonates becomes long. In particular, for example, where the position indicator 1 transmits writing pressure data which varies gradually, when changeover to the first resonance circuit 11 is performed midway of the transmission, if the period becomes long, then the writing pressure data is interrupted, which gives rise to a discontinuous state.

In order to make the changeover speed higher, it is necessary not only that the reaction speed of the changeover circuit from the second resonance circuit 12 to the first resonance circuit 11 is high but also that the speed in rise of the new resonance circuit upon changeover is high.

In the embodiment described above, a variation device is connected in parallel with the first resonance circuit 11 (reference resonance circuit) to configure the second resonance circuit 12, and the switch circuit 12SW is provided in series with the variation device in order to perform changeover between the first resonance circuit 11 and the second resonance circuit 12 and besides the switch circuit 12SW formed from a switch circuit of the type which normally is in an on (close) state but is changed over to an off (open) state when a particular signal is received.

Accordingly, in normal operation, the switch circuit 12SW keeps a normally on (normally-on) state, and in the position indicator 1, the second resonance circuit 12 resonates. Then, by placing the switch circuit 12SW into an open state instantaneously only when a reference frequency and phase are required in accordance with a request by a predetermined signal from the position detection apparatus 200B, the variable capacitor 12C that is an example of a variation device is disconnected to perform changeover to the first resonance circuit 11. Then, after transmission and reception of a signal are performed, the switch circuit 12SW is closed thereby to connect the variable capacitor 12C which is an example of a variation device again to cause the second resonance circuit to operate. As a result, in the position indicator 1 of the first embodiment, changeover to the first resonance circuit 11 which is a reference resonance circuit can be performed instantaneously and changeover back to the second resonance circuit 12 can be performed instantaneously.

Conventionally, in a technology of this type, a switch (normally-off) which is normally off is used such that a variation device is connected in parallel with the first resonance circuit 11 which makes a reference. However, since this circuit configuration includes the parallel connection of the variation device to the first resonance circuit 11, the switch is configured so as to be change over to an on state, and therefore, a resistance component (on resistance) included in the switch and a capacitance component of the variation device, for example, of a variable capacitor are added. In particular, since the CR circuit is added to the resonance circuit, the time constant varies a little. This makes the speed of the rise of the signal low.

On the other hand, in the configuration of the first embodiment described above, when the second resonance circuit 12 operates, also the first resonance circuit 11 operates simultaneously. Since the switch circuit 12SW is opened (turned off) from this state, there is no influence of the CR circuit at a point of time of changeover to the first resonance circuit 11. Further, even if the switch circuit 12SW is closed (turned back to on), since charge already exists in the variable capacitor 12C as an example of a variation device, the influence of the addition of the CR circuit is low. Accordingly, changeover to the first resonance circuit 11 which is a reference resonance circuit can be performed instantaneously, and also changeover back to the second resonance circuit 12 can be performed instantaneously.

Second Embodiment

A second embodiment described below is a modification to the internal circuit of the position indicator 1 of the first embodiment described hereinabove.

In the position indicator 1 of the first embodiment described above, the second resonance circuit 12 in the internal circuit is configured such that it connects the switch circuit 12SW, which normally is on, in series with the variable capacitor 12C and the series circuit of the variable capacitor 12C and the switch circuit 12SW is further connected in parallel with the first resonance circuit 11. However, the configuration of the second resonance circuit of the position indicator of the present disclosure is not limited such a configuration example as just described.

Figure 9:
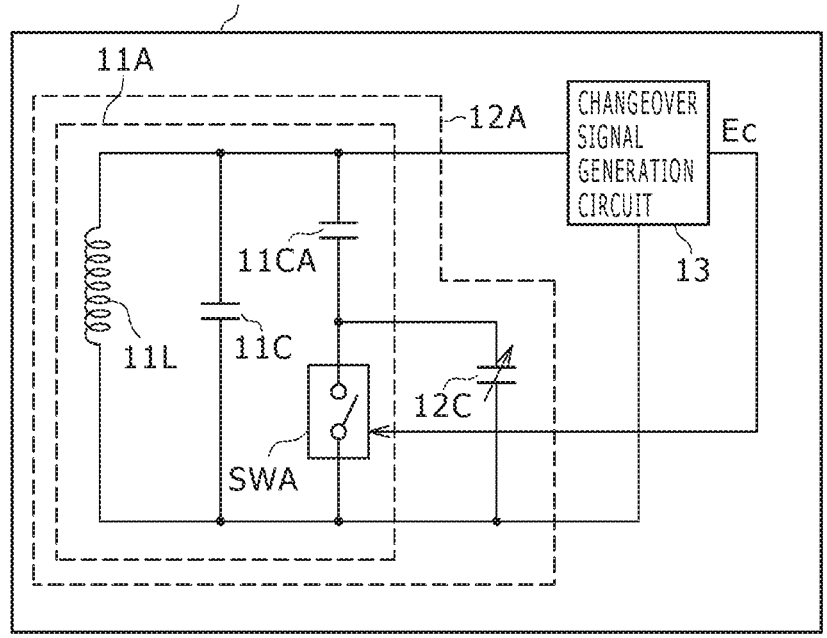
FIG. 9 is a view depicting an example of a circuit of part of a position indicator according to an embodiment the present disclosure.

FIG. 9 is a view depicting an example of a configuration of the internal circuit of a position indicator 1A of the second embodiment. In the example of FIG. 9, like elements to those of the internal circuit configuration of the position indicator 1 of the first embodiment described hereinabove are denoted by like reference symbols, and description of them is omitted herein. Further, since the position detection apparatus 200A and 200B are similar to that in the example described above, description of them is omitted herein.

In the example of FIG. 9, similarly as in the first embodiment, a coil 11L and a capacitor 11C are connected in parallel, and further, a series circuit of a capacitor 11CA and a switch circuit SWA is configured in parallel with the coil 11L and the capacitor 11C. Further, a variable capacitor 12C is connected in parallel with the switch circuit SWA.

The switch circuit SWA is configured such that an n-type field effect transistor which is, for example, off in a normal state (normally off type) is used therefor, and the switch circuit SWA is changed over from an off state to an on state when the held voltage Ec of the holding capacitor 134 of the changeover signal generation circuit 13 exceeds the threshold value voltage Eth.

When the switch circuit SWA is off, the internal resonance circuit of the position indicator 1A is a second resonance circuit 12A in which the coil 11L, the capacitor 11C and the series circuit of the capacitor 11CA and the variable capacitor 12C are connected in parallel. On the other hand, when the switch circuit SWA is on, the internal resonance circuit of the position indicator 1A is a first resonance circuit 11A in which the coil 11L, the capacitor 11C and the series circuit of the capacitor 11CA and the switch circuit SWA are connected in parallel.

Accordingly, similarly as in the first embodiment, when the position indicator 1A is in the normal state in which it does not receive any signal and when the position indicator 1A is in the state in which it is used together with the position detection apparatus 200A of the conventional type, the held voltage Ec of the holding capacitor 134 of the changeover signal generation circuit 13 does not exceed the threshold value voltage Eth. Therefore, the switch circuit SWA is changed over to an off state, and the resonance circuit for electromagnetic coupling of the position indicator 1A of the present second embodiment is the second resonance circuit 12A and includes the variable capacitor 12C as an element of the resonance circuit for electromagnetic coupling of the position indicator 1A.

Consequently, the position detection apparatus 200A of the conventional type receives a signal from the position indicator 1A and detects a frequency shift or a phase shift by a capacitive component of the variable capacitor 12C from the frequency fo of the transmission signal similarly as in the first embodiment described hereinabove. This makes it possible for the position detection apparatus 200A of the conventional type to detect the writing pressure applied to the position indicator 1A similarly as in the prior art.

Then, in order to detect the writing pressure from the difference from a signal of the resonance frequency of the second resonance circuit 12 in the state in which the position indicator 1A is used together with the position detection apparatus 200B of the novel type, if a timing at which a signal of the resonance frequency of the first resonance circuit is to be acquired comes, then the held voltage Ec of the holding capacitor 134 of the changeover signal generation circuit 13 exceeds the threshold value voltage Eth in a similar manner as in the first embodiment, and therefore, the switch circuit SWA is changed over to an on state. Therefore, the resonance circuit for electromagnetic coupling of the position indicator 1A of the present second embodiment is changed over from the second resonance circuit 12A to the first resonance circuit 11A.

Accordingly, when the position detection apparatus 200B of the novel type is used together with the position indicator 1A of this second embodiment, it can detect the writing pressure on the basis of the difference (frequency difference or phase difference) between a signal of the resonance frequency of the second resonance circuit 12A and a signal of the resonance frequency of the first resonance circuit 11A in a similar manner as in the first embodiment.

Third Embodiment

Figure 10:
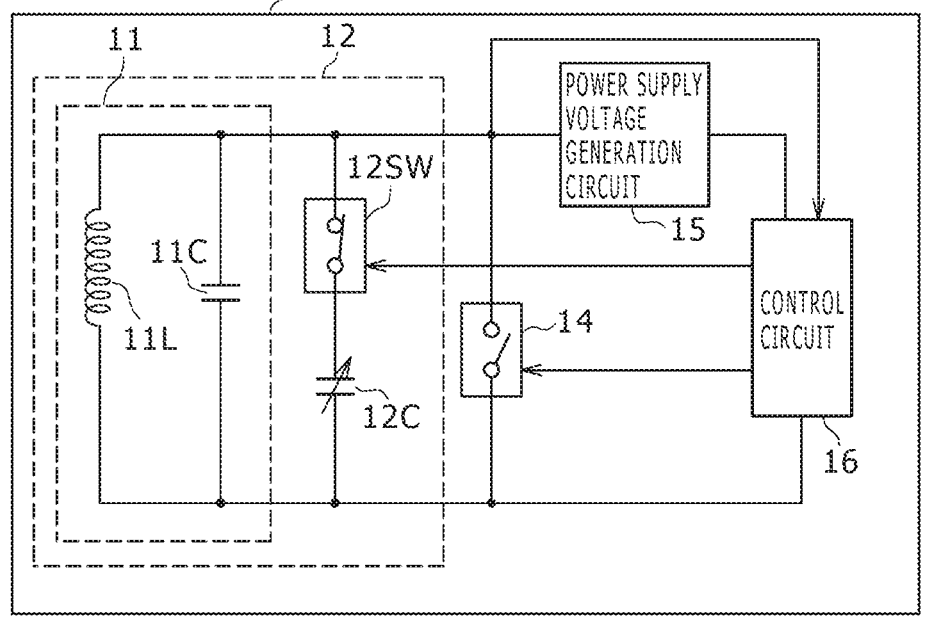
FIG. 10 is a view depicting an example of a circuit of part of a position indicator according to an embodiment of the present disclosure.
Figure 11:
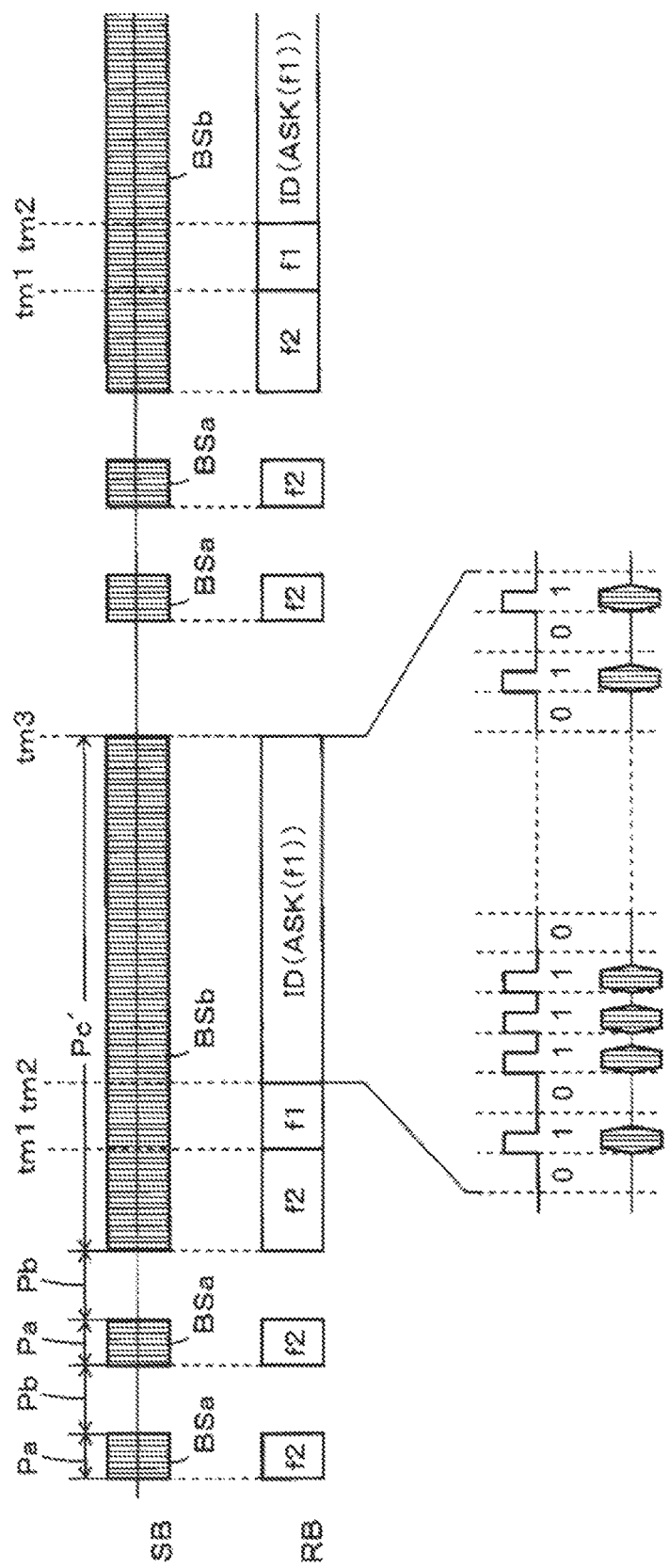
FIG. 11 is a timing chart illustrating an example of a processing operation of a position indicator according an embodiment to the present disclosure.

FIGS. 10 and 11 depict an example of a configuration of an internal circuit of a position indicator 1B of a third embodiment. The present third embodiment is a modification to the first embodiment. The position indicator 1B of the present third embodiment has a function of changing over, when a predetermined signal is received at a timing at which the writing pressure from the position detection apparatus 200B is to be detected, the resonance circuit from the second resonance circuit to the first resonance circuit and then transmitting predetermined data to the position detection apparatus 200B. In the third embodiment described below, the position indicator 1B has a function of transmitting, as an example of the predetermined data, identification information of the position indicator 1B itself to the position detection apparatus 200B.

In the position indicator 1B of the present third embodiment, a switch circuit 14 is provided which switches a resonance circuit for electromagnetic coupling (first resonance circuit 11 and second resonance circuit 12) on and off. Further, in the position indicator 1B of the present third embodiment, a power supply voltage generation circuit 15 is provided which generates a power supply voltage from a signal obtained by electromagnetic induction by the first resonance circuit 11 or the second resonance circuit 12, and a control circuit 16 is provided.

The power supply voltage generation circuit 15 includes, for example, an electric double layer capacitor and a secondary battery and charges them with a signal obtained by electromagnetic induction by the first resonance circuit 11 or the second resonance circuit 12 to generate a power supply voltage. The electric double layer capacitor and the secondary battery may be charged not only by a signal obtained by the position indicator 1B through electromagnetic induction from the position detection apparatus 200A or 200B but also by a signal from a charging apparatus for exclusive use which is prepared in the position indicator 1B of the present third embodiment and to which the position indicator 1B is electromagnetically coupled.

The control circuit 16 is driven by the power supply voltage received from the power supply voltage generation circuit 15. Further, the control circuit 16 is configured such that it receives a signal from the first resonance circuit 11 or the second resonance circuit 12 and has a function of measuring a time length or a time interval of the burst signal BSa or BSb from the position detection apparatus 200B. The control circuit 16 thereby detects a writing pressure detection timing from the position detection apparatus 200B.

Also in this third embodiment, the position detection apparatus 200B sends out a burst signal BSa and sends out a burst signal BSb at a detection timing of the writing pressure as illustrated in FIG. 11 in a similar manner as in the first embodiment. However, in the present third embodiment, the continuous transmission time length of the burst signal BSb to be sent out at a detection timing of the writing pressure is set to a time length Pc' which takes a reception time period (sending out time period) of an identification signal ID from the position indicator 1B in addition to a time period for writing pressure detection based on the frequency difference (phase difference). Thus, the position detection apparatus 200B repetitively repeats the operation described above cyclically as illustrated in FIG. 11.

The control circuit 16 of the position indicator 1B detects the burst signal BSb from the position detection apparatus 200B to change over the resonance circuit for electromagnetic coupling of the position indicator 1B from the second resonance circuit 12 of a second resonance frequency f2 to the first resonance circuit 11 of a first reference frequency f1 at a time point tm1. Consequently, the position detection apparatus 200B detects the indication position by the position indicator 1B on the basis of a signal RB received from the position indicator 1B and detects the writing pressure applied to the position indicator 1B on the basis of the difference between the first reference frequency f1 and the second resonance frequency f2.

Further, in the present example, within a period between a time point tm2 at which a predetermined time period determined taking a time period for writing pressure detection based on the frequency difference from the time point tm1 elapses and a time point tm3, the switch circuit 14 is changed over between on and off to transmit the identification information ID of the position indicator 1B to the position detection apparatus 200B.

In particular, the control circuit 16 of the present example has stored in a built-in memory thereof the identification information ID configured from a plurality of bits, and as depicted in FIG. 11, when the bit of the identification information ID is "0," the control circuit 16 changes over the switch circuit 14 to an on state to short circuit the opposite ends of the first resonance circuit 11 (and the second resonance circuit 12) of the position indicator 1B to change over the resonance circuit for electromagnetic coupling of the position indicator 1B to an off state such that the signal RB is not transmitted to the position detection apparatus 200B. On the other hand, when the bit of the identification information ID is "1," the control circuit 16 changes over the switch circuit 14 to an off state to drive the resonance circuit for electromagnetic coupling of the position indicator 1B configured from the first resonance circuit 11 such that the signal RB is transmitted to the position detection apparatus 200B.

Consequently, a signal (amplitude shift keying (ASK) signal) formed by ASK modulation of a signal of the reference frequency f1 is transmitted as the signal RB to the position detection apparatus 200B. In the position detection apparatus 200B, the process controlling unit 229B detects the ASK modulated identification information ID, for example, on the basis of a signal from the A/D conversion circuit 228.

In this manner, in the present third embodiment, when a timing at which the position detection apparatus 200B is to detect the writing pressure comes, a burst signal having a great time length is sent out as the signal SB to the position indicator 1B such that, in the position indicator 1B, the resonance circuit for electromagnetic coupling is changed over from the second resonance circuit 12 to the first resonance circuit 11. After the predetermined time period after the changeover, the identification information ID of the position indicator 1B is transmitted as an ASK signal to the position detection apparatus 200B.

Accordingly, the present third embodiment exhibits such an advantageous effect that, in the position detection apparatus 200B, writing pressure information applied to the position indicator 1B can be detected accurately without being influenced by a peripheral environment and the identification information ID of the position indicator 1B can be obtained by the position detection apparatus 200B.

It is to be noted that, while, in the third embodiment described hereinabove, the predetermined data to be transmitted to the position detection apparatus 200B of the novel type in addition to writing pressure information is identification information of the position indicator 1B, not only the identification information but also various kinds of information can be transmitted as an ASK modulation signal to the position detection apparatus 200B.

Other Embodiments and Modifications

Other Examples of Variation Device

Although, in the first to third embodiments described above, the variation device included in the second resonance circuit is the variable capacitor 12C which varies the capacitance in response to the writing pressure applied to the position indicator, the variation device is not limited to the variable capacitor. For example, the variation device can be configured also from a variable inductance element which has an inductance value which varies in response to the writing pressure applied to the position indicator or a variable resistance element which has a resistance value which varies in response to the writing pressure applied to the position indicator.

Figure 12A:
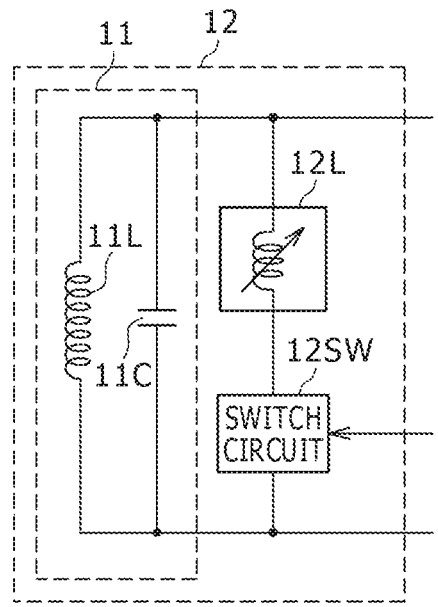
FIGS. 12A and 12B each depict an example of a configuration of a position indicator according to an embodiment of the present disclosure.
Figure 12B:
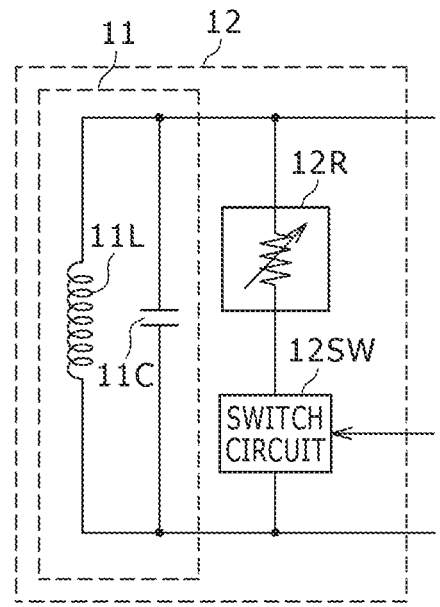

FIGS. 12A and 12B each illustrating a state in which, in the first embodiment, such a variable inductance element or a variable resistance element as described above is connected as the variation device. In particular, FIG. 12A depicts an example in which a variable inductance element 12L having an inductance value which varies in response to the writing pressure applied to the position indicator is connected in series with the switch circuit 12SW and the series circuit is connected in parallel with the first resonance circuit 11 to configure the second resonance circuit 12. Meanwhile, FIG. 12B depicts an example in which a variable resistance element 12R having a resistance value which varies in response to the writing pressure applied to the position indicator is connected in series with the switch circuit 12SW and the series circuit is connected in parallel with the first resonance circuit 11 to configure the second resonance circuit 12. It is a matter of course that the examples of the variation device can be applied also to the second embodiment and the third embodiment.

Further, information relating to an act of the user in the position indicator demonstrated by the variation device is not limited to the writing pressure information applied to the position indicator. For example, the position indictor sometimes has provided thereon a slider or a wheel operation unit for adjusting the degree of variation of a selected graphical parameter such as the thickness, color, shade or gray scale of a line. Such information relating to an act of the user in the position indicator demonstrated by the variation device may be information for adjusting the degree of variation of the graphical parameter according to an adjustment operation of the user for the slider or the wheel operation unit.

Figure 13A:
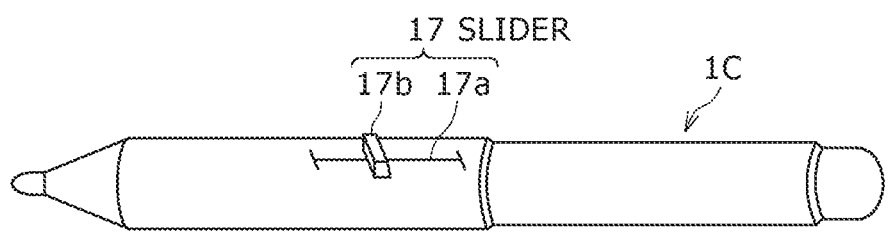
FIGS. 13A and 13B each depict an example of an appearance configuration of a position indicator according to an embodiment of the present disclosure.

FIG. 13A is a view depicting an example of an appearance of a position indicator 1C which includes a slider 17. The slider 17 varies the electrical element value of the variation device to adjust the value of a graphical parameter corresponding to the electrical element value of the variation device by slidably moving a sliding operation element 17b along a slide groove 17a as illustrated in FIG. 13A. In this case, since the electrical element value of the variation device varies in response to the sliding amount of the slider 17 may be any element which varies the resonance frequency of the resonance circuit, it may be any of a variable capacitor, a variable inductance element and a variable resistance element as described hereinabove.

Figure 13B:
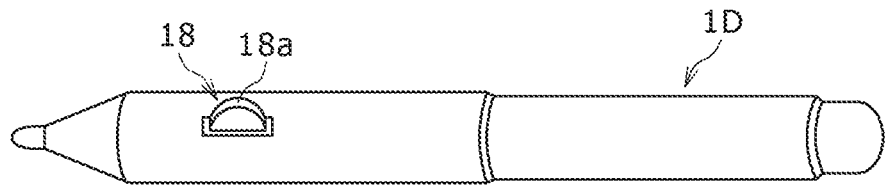

FIG. 13B is a view depicting an example of an apparatus of a position indicator 1D which includes a wheel operation unit 18. The wheel operation unit 18 varies, by rotation of a wheel 18a mounted for rotation, the electrical element value of the variation device varies in response to an amount of rotation, a rotational angle or a speed of rotation of the wheel 18a to adjust the value of a graphical parameter corresponding to the electrical element value of the variation device. The variation device may be any of a variable capacitor, a variable inductance element and a variable resistance element similarly as in the case of the slider 17.

Accordingly, the position detection apparatus 200B of the novel type used together with the position indicator 1C or 1D of the example of FIG. 13A or 13B can detect the indication position by the position indicator 1C or 1D and can receive the signal RB from the position indicator 1C or 1D and accurately determine the electrical element value of the variation device as the difference in resonance frequency of reception signals or as a phase difference, which is very convenient.

It is to be noted that the information relating to an operation of the slider or the wheel operation unit provided on the position indicator is not limited to the adjustment amount of a graphical parameter described above, and it is a matter of course that various other kinds of information can be applied as the information.

Further, the information relating to an act of the user in the position indicator not only is information of the writing pressure described above or information relating to an operation of a slider or a wheel operation unit provided on the position indicator but may be, for example, information of an angle of rotation of the position indicator or an inclination angle of the position detection apparatus on the sensor.

It is to be noted that, while the embodiments described above are described taking a case in which, as a signal to be transmitted from the position detection apparatus or the position indicator, a signal of a single frequency is transmitted in a predetermined fluctuation pattern as an example, the signal is not limited to this. For example, the present disclosure can be applied also to a case in which a plurality of signals of different frequencies is transmitted. For example, it is possible to use a signal of a frequency A as a burst signal and use a signal of a frequency B as a signal for induction.

It is to be noted that, while, in the embodiments described above, the changeover signal for changing over from the second resonance circuit 12 to the first resonance frequency is generated on the basis of a signal received from the position detection apparatus 200B through the second resonance circuit, the changeover signal may be generated from a signal acquired from a different route without passing through the second resonance circuit. In other words, a reception circuit for receiving a signal for generating the changeover signal without passing through the second resonance circuit may be provided in the position indicator such that the changeover signal is generated from a signal received by the reception circuit.

Further, in the embodiments described above, the position detection apparatus sends out a predetermined signal for changing over from the second resonance circuit to the first resonance circuit at every timing at which a signal of the resonance frequency of the first resonance circuit is acquired in order to detect the writing pressure from the difference from a signal of the reference frequency of the second resonance circuit 12. However, the predetermined signal may not be sent out at every timing at which a signal of the resonance frequency of the first resonance circuit is acquired. For example, the position detection apparatus may be configured such that it includes a holding unit which normally holds information of a resonance frequency and a phase of the first resonance circuit of a reference and sends out, in order to update the held information of the holding unit, a predetermined signal for changing over from the second resonance circuit to the first resonance circuit to the position indicator at a suitable timing and then updates the information of the holding unit with the information of the resonance frequency and the phase acquired from the position indicator in response to the predetermined signal.

DESCRIPTION OF REFERENCE SYMBOLS 1, 1A, 1B . . . Position indicator, 2 . . . Electronic apparatus, 11 . . . First resonance circuit, 11L . . . Coil, 11C . . . Capacitor, 12 . . . Second resonance circuit, 12C . . . Variable capacitor, 12SW . . . Switch circuit, 12T . . . Junction type field effect transistor (JFET), 13 . . . Changeover signal generation circuit, 14 . . . Switch circuit, 15 . . . Power supply voltage generation circuit, 16 . . . Control circuit, 200A . . . Position detection apparatus of conventional type, 200B . . . Position detection apparatus of novel type

The invention claimed is:
1. A position indicator configured to establish electromagnetic coupling with a conductor of a sensor of a position detection apparatus, the position indicator comprising:
a first resonance circuit including an inductor and a capacitor;
a second resonance circuit including the inductor, the capacitor, and a variation device configured to vary a resonance frequency or a phase of the second resonance circuit in response to an act of a user;
a switch circuit configured to perform changeover between the first resonance circuit and the second resonance circuit; and
a changeover circuit configured to generate a changeover signal that drives the switch circuit and supply the changeover signal to the switch circuit,
wherein, when the position indicator receives a first signal pattern, the changeover circuit does not generate the changeover signal, the second resonance circuit is configured to establish electromagnetic coupling with the conductor of the sensor of the position detection apparatus, and a first signal is sent to the position detection apparatus, the first signal indicating a variation of the resonance frequency or the phase of the second resonance circuit in response to the act of the user, and
wherein, when the position indicator receives a second signal pattern different from the first signal pattern, the changeover circuit generates the changeover signal and supplies the changeover signal to the switch circuit, the switch circuit performs changeover, the first resonance circuit is configured to establish electromagnetic coupling with the conductor of the sensor of the position detection apparatus, and a second signal is sent to the position detection apparatus, the second signal not indicating the variation of the resonance frequency or the phase of the second resonance circuit in response to the act of the user.

2. The position indicator according to claim 1, wherein:
the second resonance circuit is configured to establish electromagnetic coupling with the conductor of the sensor of the position detection apparatus while the switching circuit connects the variation device in parallel with the inductor and the capacitor;
the switch circuit is connected in series with the variation device; and
when the position indicator receives the first signal pattern, the changeover circuit places the switch circuit into a conductive state, and when the position indicator receives the second signal pattern, the changeover circuit places the switch circuit into a non-conductive state.

3. The position indicator according to claim 2, wherein:
the switch circuit includes a junction type field effect transistor.

4. The position indicator according to claim 2, wherein:
the switch circuit includes a plurality of junction type field effect transistors connected in parallel with each other.

5. The position indicator according to claim 2, wherein:
the switch circuit includes a depletion type field effect transistor.

6. The position indicator according to claim 1, wherein:
the second resonance circuit includes the variation device connected in parallel with the inductor and the capacitor;
the switch circuit is connected in parallel with the variation device; and
when the position indicator receives the first signal pattern, the changeover circuit places the switch circuit into a non-conductive state; and
when the position indicator receives the second signal pattern, the changeover circuit places the switch circuit into a conductive state.

7. The position indicator according to claim 1, wherein:
the changeover circuit generates the changeover signal based on the second signal pattern.

8. The position indicator according to claim 7, wherein:
the second signal is a burst signal having a continuous transmission time period that is equal to or longer than a given time period.

9. The position indicator according to claim 1, wherein:
the second signal pattern is received through the second resonance circuit.

10. The position indicator according to claim 1, wherein:
the variation device is configured to vary the resonance frequency or the phase of the second resonance circuit in response to a pressure applied to a core member of the position indicator.

11. The position indicator according to claim 10, wherein the variation device is a variable capacitor having a capacitance value that varies in response to the pressure applied to the core member of the position indicator.

12. The position indicator according to claim 1, wherein:
the switch circuit includes a field effect transistor.

13. The position indicator according to claim 1, further comprising:
a second switch circuit connected to the first resonance circuit and the second resonance circuit, the second switch circuit being configured to perform on and off control of a resonance operation of the first resonance circuit and the second resonance circuit; and
a control circuit which performs on and off control of the second switch circuit based on data that is to be sent as an amplitude shift keying signal to outside of the position indicator.

14. The position indicator according to claim 1, wherein:
the second signal pattern is received from the position detection apparatus, and
the position detection apparatus is configured to detect a difference between a first signal having a resonance frequency of the first resonance circuit and a second signal having the resonance frequency of the second resonance circuit to detect the information relating to the act of the user.

15. A method comprising:
providing a position indicator that includes a first resonance circuit and a second resonance circuit, the first resonance circuit including an inductor connected in parallel with a capacitor, the second resonance circuit including the inductor, the capacitor, a switch circuit, and a variation device connected in series with the switch circuit, the variation device connected in series with the switch circuit being connected in parallel with the inductor and the capacitor;
receiving a first signal pattern by the position indicator;
in response to receiving the first signal pattern by the position indicator, controlling the switch circuit to be in a non-conductive state, wherein the non-conductive state is a state in which the first resonance circuit is configured to establish electromagnetic coupling with a conductor of a sensor of a position detection apparatus and a first signal is sent to the position detection apparatus, the first signal indicating a variation of a resonance frequency or a phase of the second resonance circuit in response to an act of a user;
receiving a second signal pattern different from the first signal pattern by the position indicator; and
in response to receiving the second signal pattern by the position indicator, controlling the switch circuit to be in a conductive state, wherein the conductive state is a state in which the second resonance circuit is configured to establish electromagnetic coupling with the conductor of the sensor of the position detection apparatus and a second signal is sent to the position detection apparatus, the second signal not indicating the variation of the resonance frequency or the phase of the second resonance circuit in response to the act of the user.

16. The method according to claim 15, further comprising changing a resonance frequency or a phase of the second resonance circuit in response to an act of a user.

17. The method according to claim 16, further comprising:
receiving a first signal while the first resonance circuit is electromagnetically coupled with the conductor of the sensor;
receiving a second signal while the second first resonance circuit is electromagnetically coupled with the conductor of the sensor;
determining a difference between the first signal and the second signal; and
detecting information relating to the act of the user based on the difference between the first signal and the second signal.

18. The method according to claim 17, wherein the determining of the difference between the first signal and the second signal includes determining a difference between a frequency of the first signal and a frequency of the second signal.

19. The method according to claim 17, wherein the determining of the difference between the first signal and the second signal includes determining a difference between a phase of the first signal and a phase of the second signal.

* * * * *